US012795480B2

(12) United States Patent
Palle Venkata et al.

(10) Patent No.: US 12,795,480 B2
(45) Date of Patent: Nov. 10, 2026

(54) MEDIA ACCESS CONTROL (MAC) RESET AND/OR RADIO LINK CONTROL (RLC) RESET IN LAYER 1/LAYER 2 MOBILITY

(71) Applicant: Apple Inc., Cupertino, CA (US)

(72) Inventors: Naveen Kumar R. Palle Venkata, San Diego, CA (US); Fangli Xu, Beijing (CN); Haijing Hu, Los Gatos, CA (US); Peng Cheng, Beijing (CN); Ping-Heng Kuo, London (GB); Ralf Rossbach, Munich (DE); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 18/620,943

(22) Filed: Mar. 28, 2024

(65) Prior Publication Data

US 2024/0340733 A1 Oct. 10, 2024

Related U.S. Application Data

(63) Continuation of application No. PCT/CN2023/086349, filed on Apr. 5, 2023.

(51) Int. Cl.

| | |
|---|---|
| ***H04W 36/04*** | (2009.01) |
| ***H04W 76/10*** | (2018.01) |
| ***H04W 76/20*** | (2018.01) |

(52) U.S. Cl.

CPC ........... *H04W 36/04* (2013.01); *H04W 76/10* (2018.02); *H04W 76/20* (2018.02)

(58) Field of Classification Search

None

See application file for complete search history.

(56) References Cited

U.S. PATENT DOCUMENTS

| | | | | |
|---|---|---|---|---|
| 12,500,649 | B2 * | 12/2025 | Huang | H04B 7/06952 |
| 2018/0184307 | A1 * | 6/2018 | Periyasamy | H04M 15/61 |

(Continued)

FOREIGN PATENT DOCUMENTS

| | | | |
|---|---|---|---|
| CN | 108738081 | A | 11/2018 |
| CN | 114097301 | A | 2/2022 |
| CN | 115918163 | A | 4/2023 |

OTHER PUBLICATIONS

International Patent Application No. PCT/CN2023/086349, "International Preliminary Report on Patentability", Oct. 16, 2025, 5 pages.

(Continued)

*Primary Examiner* — Otis L Thompson, Jr.

(74) *Attorney, Agent, or Firm* — Kilpatrick Townsend & Stockton LLP

(57) ABSTRACT

The present application relates to devices and components including apparatus, systems, and methods for L2 resets. For example, a UE can be connected to a base station DU via a first cell and can be configured with information about a second cell. This information can indicate whether an LTM association exists between the first cell and the second cell (e.g., whether these two cells are provided by the same base station DU or not). Upon a command to establish a connection with the second cell (e.g., a MAC CE handover command), the UE can determine whether an L2 reset is to be performed or not based on the configuration information (e.g., the L2 reset can be foregone when the two cells are provided by the same base station DU; otherwise, the L2 reset can be performed).

16 Claims, 15 Drawing Sheets

(56) References Cited

U.S. PATENT DOCUMENTS

| | | | | |
|---|---|---|---|---|
| 2019/0313296 | A1* | 10/2019 | Yiu | H04W 36/0064 |
| 2020/0177497 | A1 | 6/2020 | Xiao et al. | |
| 2023/0199571 | A1* | 6/2023 | Babaei | H04W 56/0015 370/331 |
| 2023/0388871 | A1* | 11/2023 | Guo | H04W 36/0069 |
| 2023/0422123 | A1* | 12/2023 | Zhang | H04W 36/18 |
| 2024/0049085 | A1* | 2/2024 | Tseng | H04W 36/0055 |
| 2024/0129819 | A1* | 4/2024 | Zhou | H04W 24/02 |
| 2024/0147328 | A1* | 5/2024 | Kim | H04W 36/30 |
| 2024/0155449 | A1* | 5/2024 | Damnjanovic | H04W 36/008357 |
| 2024/0155456 | A1* | 5/2024 | Akl | H04W 36/0055 |
| 2024/0179602 | A1* | 5/2024 | Damnjanovic | H04W 36/362 |
| 2024/0224128 | A1* | 7/2024 | Chandrashekar | H04W 36/0016 |
| 2024/0267807 | A1* | 8/2024 | Peng | H04L 1/1812 |
| 2024/0267820 | A1* | 8/2024 | Zhou | H04W 36/0085 |
| 2024/0276316 | A1* | 8/2024 | Akl | H04W 36/32 |
| 2024/0292293 | A1* | 8/2024 | Bai | H04W 24/10 |
| 2024/0323777 | A1* | 9/2024 | Agiwal | H04W 36/0072 |
| 2025/0294417 | A1* | 9/2025 | Abdul Latheef | H04W 36/0072 |
| 2025/0374132 | A1* | 12/2025 | Teyeb | H04W 12/041 |
| 2026/0019901 | A1* | 1/2026 | Kim | H04W 36/04 |
| 2026/0025875 | A1* | 1/2026 | Abdul Latheef | H04W 56/0045 |

OTHER PUBLICATIONS

The International Application No. PCT/CN2023/086349, "International Search Report and Written Opinion" , mailed Nov. 16, 2023, 7 pages.

Cell Switch for L1/L2 Triggered Mobility, 3 Generation Partnership Project Technical Specification Group-Radio Access Network Working Group 2 Meeting #120, R2-2211847, Nov. 14-18, 2022, 5 pages.

Discussion on the Execution of LTM Cell Switch, 3 Generation Partnership Project Technical Specification Group-Radio Access Network Working Group 2 #120, R2-2212436, Nov. 14-18, 2022, 9 pages.

LTM General Aspects and Scenarios, 3 Generation Partnership Project Technical Specification Group-Radio Access Network Working Group 4 Meeting #105, R4-2219443, Nov. 14-18, 2022, 8 pages.

MAC/RLC Reset and BWP Handling for LTM, 3 Generation Partnership Project Technical Specification Group-Radio Access Network Working Group 2 Meeting #121, R2-2300181, Feb. 27-Mar. 3, 2023, 5 pages.

RRC Aspects of L1/L2 Triggered Mobility, 3 Generation Partnership Project Technical Specification Group-Radio Access Network Working Group 2 Meeting #121, R2-2301026, Feb. 27-Mar. 3, 2023, 4 pages.

RRC Aspects of LTM, 3 Generation Partnership Project Technical Specification Group-Radio Access Network Working Group 2 Meeting #120, R2-2212246, Nov. 14-18, 2022, 4 pages.

European Patent Application No. 23931327.3, Extended European Search Report, Mar. 17, 2026, 11 pages.

* cited by examiner

MEDIA ACCESS CONTROL (MAC) RESET AND/OR RADIO LINK CONTROL (RLC) RESET IN LAYER 1/LAYER 2 MOBILITY

CROSS-REFERENCE TO RELATED APPLICATION

The present application is a national stage entry under the Paris Convention of International Patent Application No. PCT/CN2023/086349 filed on Apr. 5, 2023, entitled Media Access Control (MAC) Reset And/Or Radio Link Control (RLC) Reset In Layer 1/Layer 2 Mobility, the contents of which is hereby incorporated by reference in its entirety.

BACKGROUND

Cellular communications can be defined in various standards to enable communications between a user equipment (UE) and a cellular network. For example, Fifth generation mobile network (5G) is a wireless standard that aims to improve upon data transmission speed, reliability, availability, and more. Cellular coverage is a relevant feature for data transmission. Cellular coverage can also change over time and/or can depend on mobility of a UE. The UE may be instructed to establish connections with different cells of the cellular network to maintain the cellular coverage.

DETAILED DESCRIPTION

Figure 1:
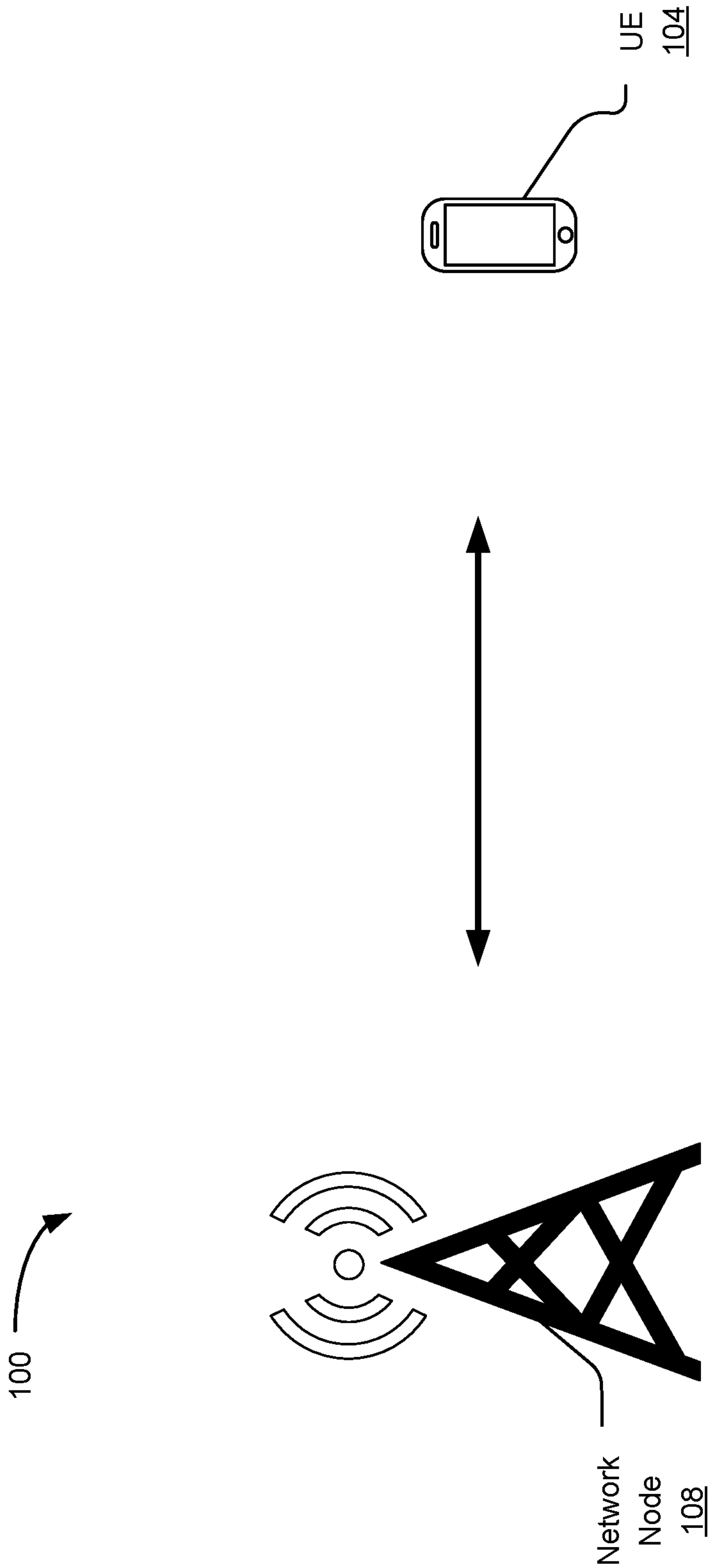
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art, having the benefit of the present disclosure, that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) communicates with a network when the UE is in a network coverage of the network. The network coverage can be provided via a base station of the network. The base station can include central unit (CU) and/or one or more distributed units (DUs). The CU can control operations of a DU may be partly controlled by the CU. In comparison, the DU can support one or more cells. Depending on network coverage conditions, an intra-DU mobility procedure or an inter-DU mobility procedure may be performance. The intra-DU mobility allows the UE to move from one cell provided by a DU to another cell provided by the same DU. The inter-DU mobility procedure allows the UE to move from a cell provided by a DU to a cell provided by another DU controlled by the same CU.

As used herein, layer two (L2) reset refers to at least one of a medium access control (MAC) reset or a radio link control (RLC) reset. Depending on whether a mobility procedure for a UE is for an intra-DU case or an inter-DU case, the L2 reset can be performed or foregone. Generally, the L2 reset is performed in the inter-DU case. In comparison, the L2 reset is foregone in the intra-D case.

The UE can be configured (e.g., via radio resource control (RRC) signaling) with information about the candidate cells (which may be referred to herein as Layer one (L1)/L2 triggered mobility (LTM) cells). The UE can also be configured with information about grouping of such LTM cells. A group includes LTM cells having an LTM association, where the LTM association indicates that the cells are provided by a same DU.

The UE can have an established first connection with a first cell and can be instructed to establish a second connection with a second cell. For example, the first cell and the second cell are a source cell and a target cell, respectively, in a handover command. Based on the group information, the UE can determine whether an LTM association exists between the two cells. If so, the L2 reset can be foregone because the instructions correspond to an intra-DU mobility procedure. Otherwise, the L2 reset can be performed.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, device, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The UE may have a primary function of communication with another UE or a network and the UE may be integrated with other devices and/or systems (e.g., in a vehicle).

The term "base station" as used herein refers to a device with radio communication capabilities, that is a device of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a network node 108. The network node 108 may be a base station that provides a wireless access cell; for example, a Third-Generation Partnership Project (3GPP) New Radio (NR) cell, through which the UE 104 may communicate with the network node 108. This base station may be a component of a terrestrial network. The UE 104 and the network node 108 may communicate over an interface compatible with 3GPP technical specifications, such as those that define Fifth Generation (5G) NR system standards.

The network node 108 may transmit information (for example, data and control signaling) in the downlink direction by mapping logical channels on the transport channels, then transport channels onto physical channels. The logical channels may transfer data between a RLC and MAC layers; the transport channels may transfer data between the MAC and PHY layers; and the physical channels may transfer information across the air interface. The physical channels may include a physical broadcast channel (PBCH); a physical downlink control channel (PDCCH); and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the network node 108 to allocate both uplink and downlink resources. The DCI may also be used to provide uplink power control commands, configure a slot format, or indicate that preemption has occurred.

The network node 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include CSI-RS. The CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain, and one orthogonal frequency division multiplexing (OFDM) symbol in the time domain. Twelve consecutive subcarriers in the frequency domain may compose a physical resource block (PRB). A resource element group (REG) may include one PRB in the frequency domain, and one OFDM symbol in the time domain, for example, twelve resource elements. A control channel element (CCE) may represent a group of resources used to transmit PDCCH. One CCE may be mapped to a number of REGs; for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The network node 108 may provide transmission configuration indicator (TCI) state information to the UE 104 to indicate QCL relationships between antenna ports used for reference signals (for example, synchronization signal/PBCH or CSI-RS) and downlink data or control signaling (for example, PDSCH or PDCCH). The network node 108 may use a combination of RRC signaling, MAC control element signaling, and DCI, to inform the UE 104 of these QCL relationships.

The UE 104 may transmit data and control information to the network node 108 using physical uplink channels. Different types of physical uplink channels are possible, including a physical uplink control channel (PUCCH) and a physical uplink shared channel (PUSCH). Whereas the PUCCH carries control information from the UE 104 to the network node 108, such as uplink control information (UCI), the PUSCH carries data traffic (e.g., end-user application data) and can carry UCI.

In an example, communications with the network node 108 and/or the base station can use channels in the frequency range 1 (FR1) band (between 40 Megahertz (MHz) and 7,125 MHz) and/or frequency range 2 (FR2) band (between 24,250 MHz and 52,600 MHz), although other frequency ranges are possible (e.g., a frequency range having a frequency larger than 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device applies a clear channel assessment (CCA) check before using the channel.

In an example, the network node 108 is a base station that includes a CU and/or one or more DUs. In this example, the network coverage provided to the UE 104 can change over time and/or depending on the UE's 104 location. An inter-DU mobility procedure or an intra-DU mobility procedure can be performed to support mobility of the UE 104 and provide the proper network coverage.

In particular, a DU can provide multiple cells (e.g., each via a transmission and reception point (TRP) connected to the DU). In the context of L1/L2 mobility, such cells can be referred to as LTM cells. The UE 104 can be camped in a serving cell. The base station can configure the UE 104 with multiple candidate LTM cells. For instance, the base station can configure the UE 104 with the candidate LTM cells using one or more RRC messages.

In some instances, there can be a connection issue between the UE 104 and the serving cell, such as a radio link failure or a degradation in the signal quality. In response to the connection issue, the UE 104 can search neighboring cells to establish a connection with another cell from a group of candidate cells. The candidate cells can include some or all of the candidate LTM cells. In some instances, the candidate LTM cells can have priority over candidate non-LTM cells. In instances that the UE 104 elects to establish a connection with a candidate LTM cell, the procedure is different than if the UE 104 elects to establish a connection with a candidate cell that is not an LTM cell.

If the UE 104 determines that a candidate LTM cell includes the appropriate criteria, a DU of the base station can transmit a medium access control-control element (MAC CE) message to the UE 104 to trigger an LTM handover. UE 104 can initiate an RRC message with the target LTM cell to establish a connection.

Examples of LTM cells and related configuration information are described in the next figures.

Figure 2:
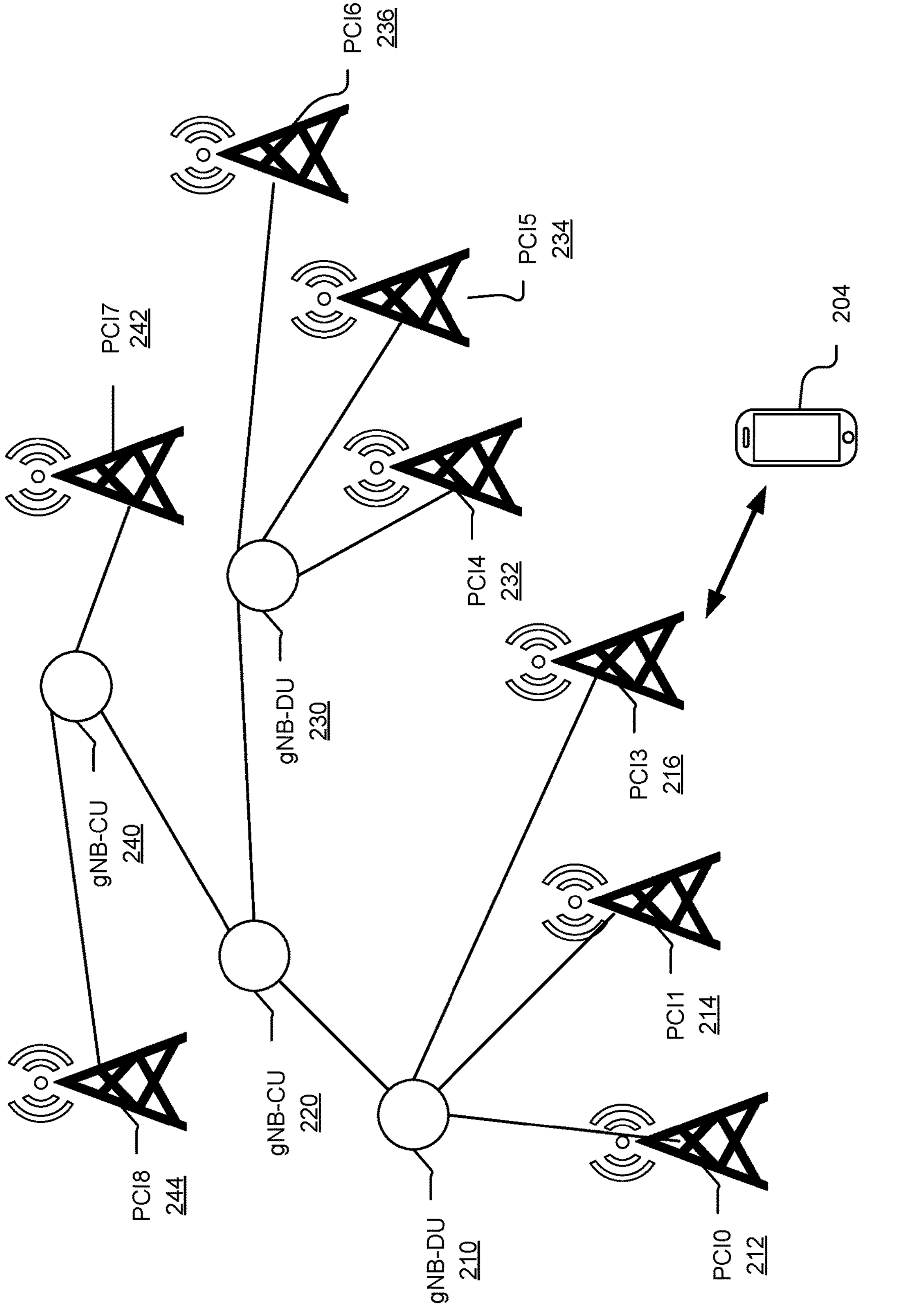
FIG. 2 illustrates an example of a network coverage based on different base stations and cells provided by such base stations, in accordance with some embodiments.

FIG. 2 illustrates an example of a network coverage based on different base stations and cells provided by such base stations, in accordance with some embodiments. The network can include base stations and can be in communication with UE 204 (which is an example of the UE 204) via one or more of such base stations (each being an example of the network node 108). A base station can include a CU and/or one or more DUs. In some embodiments, the base station may be a gNB, eNB and so on. In the example of FIG. 2, each base station is illustrated as a gNB. In such an example, the CU of a base station may be referred to as a gNB-CU, and the DU of a base station may be referred to as a gNB-DU.

For illustrative purposes, FIG. 2 illustrates a gNB-DU 210, a gNB-CU 220, a gNB-DU 230 and a g-NB CU 240. The gNB-DUs 210 and 230 are connected to the gNB-CU 220. Operations of these two gNB-DUs 210 and 230 may be partly controlled by the gNB-CU 220. The gNB-CU 220 may terminate an F1 interface connected with each of the first gNB-DU 210 and the second gNB-DU 230. Each of the first gNB-DU 210 and the second gNB-DU 230 may terminate an F1 interface connected with the gNB-CU 220.

The gNB-CU 220 may be a logical node hosting at least one of RRC, service data adaption protocol (SDAP), and packet data convergence protocol (PDCP) protocols of a base station. The gNB-CU 240 may be a logical node hosting at least one of RRC, SDAP and PDCP protocols of another base station.

Each of the first gNB-DU 210 and the second gNB-DU 230 may be a logical node hosting at least one of RLC, MAC, and physical (PHY) layers of a base station. Each of the first gNB-DU 210 and the second gNB-DU 230 may provide or support one or more cells. One cell is supported by only one DU. For example, the first gNB-DU 210 may provide cells 212 (having a physical cell ID "0" shown as PCI0), 214 (having a physical cell ID "1" shown as PCI1), and 216 (having a physical cell ID "3" shown as PCI3). Each cell can be provided by a TRP connected to the NB DU 210. Similarly, the second gNB-DU 230 may provide cells 232 (having a physical cell ID "4" shown as PCI4), 234 (having a physical cell ID "5" shown as PCI5), and 236 (having a physical cell ID "6" shown as PCI6). Each cell can be provided by a TRP. As used herein, a cell can refer to components of a TRP and/or of a base station, where these components enable communications with a UE.

The gNB-CU 240 may also provide or support one or more cells. For example, the gNB-CU 240 may provide cells 2242 (having a physical cell ID "7" shown as PCI7) and 244 (having a physical cell ID "8" shown as PCI8).

It is to be understood that the numbers of UEs, CUs and DUs are only for the purpose of illustration without suggesting any limitations to the present disclosure. The network may include any suitable number of UEs, CUs and DUs adapted for implementing implementations of the present disclosure.

The communications in the network may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like.

Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

The UE 204 may access one cell provided by the first gNB-DU 210. For example, the UE 204 may be initially connected to the cell 216 provided by the first gNB-DU 210. Based on measurements, the UE 204 may perform an intra-DU mobility procedure so as to move from the cell 216 to another cell provided by the first gNB-DU 210. For example, the UE 204 may perform an intra-DU mobility procedure so as to move from the cell 216 to one of the cells 212 or 214. Hereinafter, the intra-DU mobility is also referred to as intra-gNB-DU mobility.

Alternatively, based on measurements, the UE 204 may perform an inter-DU mobility procedure so as to move from a cell provided by the first gNB-DU 210 to a cell provided by the second gNB-DU 220. For example, the UE 204 may perform an inter-DU mobility procedure so as to move from the cell 216 provided by the first gNB-DU 210 to one of the cells 232, 234, or 236 provided by the second gNB-DU 230. Hereinafter, the inter-DU mobility is also referred to as inter-gNB-DU mobility.

In some embodiments, the UE 204 may be in dual connectivity (DC) with the gNB-CUs 220 and 240. The intra-DU mobility procedure and the inter-DU mobility procedure may be allowed when the gNB-CU 220 is configured as a secondary node (SN) in a DC configuration while the gNB-CU 240 is configured as a master node (MN).

For illustrative purposes, assume that the UE 204 is in CONNECTED mode with PCI3 (e.g., the cell 216 is the current serving cell). The network should be capable of configuring L2 mobility with PCI0 and/or PCI1 as intra-DU mobility and/or with PCI4, PCI5, and/or PCI6 as inter-DU mobility. Differences exist between the intra-DU mobility and the inter-DU mobility. For example, a MAC reset and/or a an RLC reset may be needed for the inter-DU mobility but may be avoided in the intra-DU case. In particular, consider the situations of the UE 204, prior to a handover, having received a number of packets via the serving cells and having indicated to the gNB-DU 210 (e.g., via a hybrid automatic repeat request (HARQ) procedure) erroneous packets that need retransmission. If the handover is to an intra-cell (e.g., any of PCI0 or PCI1), the gNB-DU 210 can retransmit the erroneous packets without the need for any of the MAC reset or the RLC reset. If the handover is to inter-cell (e.g., any of PCI 4, PCI5, or PCI 6), the gNB-DU 230 can receive, via the gNB-CU 220, the relevant information from the gNB-DU 210 so that the gNB-DU 230 can retransmit the erroneous packets to the UE 204. Nonetheless, to improve the network latency, one or both of the MAC reset or the RLC reset can be performed by the UE 204. Particularly, the gNB-DU 230 need not receive the HARQ-related information from the gNB-DU 210 via the gNB-CU 220. In the case of both resets being performed, the UE 204 can discard the received packets (including the ones that are correctly detected) and can expect to receive all packets anew from the gNB-DU 230 after the handover. A similar situation can exist when the handover is to a cell of the gNB-CU 240, whereby here the MAC reset and the RLC reset are both performed.

Figure 3:
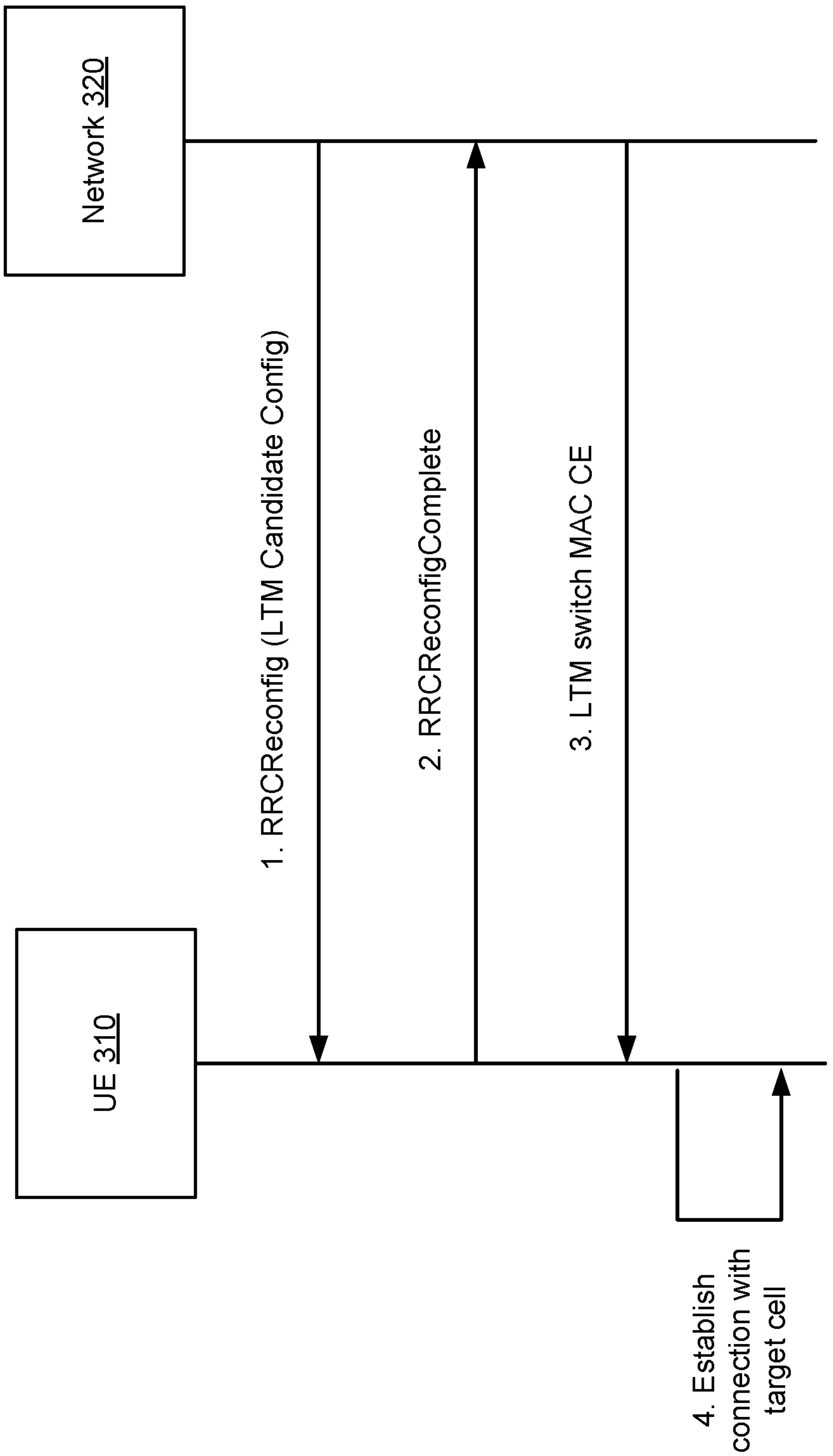
FIG. 3 illustrates an example of a procedure for establishing a connection with a cell, in accordance with some embodiments.

FIG. 3 illustrates an example of a procedure for establishing a connection with a cell, in accordance with some embodiments. The procedure can be implemented by a UE 310 (an example of the UE 204) and a network 320 (as the one described herein above) that includes base station CUs and DUs. Generally, the UE 310 receives from the network 320 (e.g., a gNB-CU thereof) configuration information for one or more sets of candidate cells for intra-DU mobility and/or for one or more sets of candidate cells for inter-DU mobility. The configuration information can be received via RRC signaling. Subsequently, the UE 310 can be instructed to establish one or more connections (e.g., via a MAC handover command). Here, based on a source cell and a target cell, the UE 310 can determine whether an LTM association exists between the two cells (as indicated in the configuration information) and, if so, whether an L2 reset is to be performed or foregone in association with establishing the connection to the target cell. FIG. 3 illustrates this approach in the context of an RRC reconnection procedure.

In the example illustration, the UE 310 receives an RRCReconfiguration message from the network 320 (or multiple ones of such message from, for example, a gNB-CU). The received RRC reconfiguration information indicates, among other things, configurations of candidate cells including LTM candidate cells. A configuration for a candidate LTM cell can be referred to herein as an LTM candidate cell configuration. In addition, the received RRC reconfiguration information indicates configurations for sets of LTM cells (e.g., each set represents a group of cells having an LTM association that can allow the UE to forego performing at least one of a MAC reset or an RLC reset). A configuration for a group of LTM cells can be referred to herein as an LTM group configuration. An LTM group configuration can be separate from an LTM cell configuration and, possibly, referenced in the LTM cell configuration. The UE 310 can respond to the network 320 (e.g., to the gNB-CU) with an RRCReconfigurationComplete message (or multiple ones of such message). Next, the UE 310 can receive from the network 320 (e.g., from the gNB-CU or a gNB-DU of the serving cell in which the UE 310 is camped), a connection command (e.g., a MAC CE for a handover for an LTM switch). Based on the source cell and a target cell, the UE 310 can determine from the LTM cell configuration information and/or the LTM group configuration information whether an LTM association exists between these two cells and whether a MAC reset and/or an RLC reset are to be performed. The UE 310 can then establish a connection with a TRP providing the target cell by performing a handover according to this determination. When the target cell is LTM associated with the source cell (e.g., belongs to the set of candidate cells for intra-DU mobility), the UE 310 may perform a handover to the target cell by performing an intra-DU mobility procedure and possibly avoid an L2 reset. In comparison, when the target cell is LTM unassociated with the source cell (e.g., belongs to the set of candidate cells for inter-DU mobility), the UE 310 may perform a handover to the target cell by performing an inter-DU mobility procedure that can include an L2 reset.

In this example illustration, because the cell and group configurations are provided to the UE 310 before the handover, mobility latency may be reduced. Further, the mobility latency can be further reduced by forgoing the need to perform an L2 reset when proper (e.g., during an intra-DU handover).

As such, per the procedure of FIG. 3, the UE 310 is pre-configured with multiple L2 reset groups (e.g., LTM cell groups). At an LTM switch command (e.g., with MAC CE from the network 320), if the target LTM cell (given in the MAC CE that may indicate this target cell) is part of the same group the source LTM cell is, an L2 reset may not be performed, or based on the config within the group, the UE 310 may perform only what is configured: only a MAC reset or only an RLC reset. Otherwise, the target LTM cell is not part of the same group to which the source LTM cell belongs. In this case, the UE performs the L2 reset (the MAC reset and the RLC reset).

Figure 4:
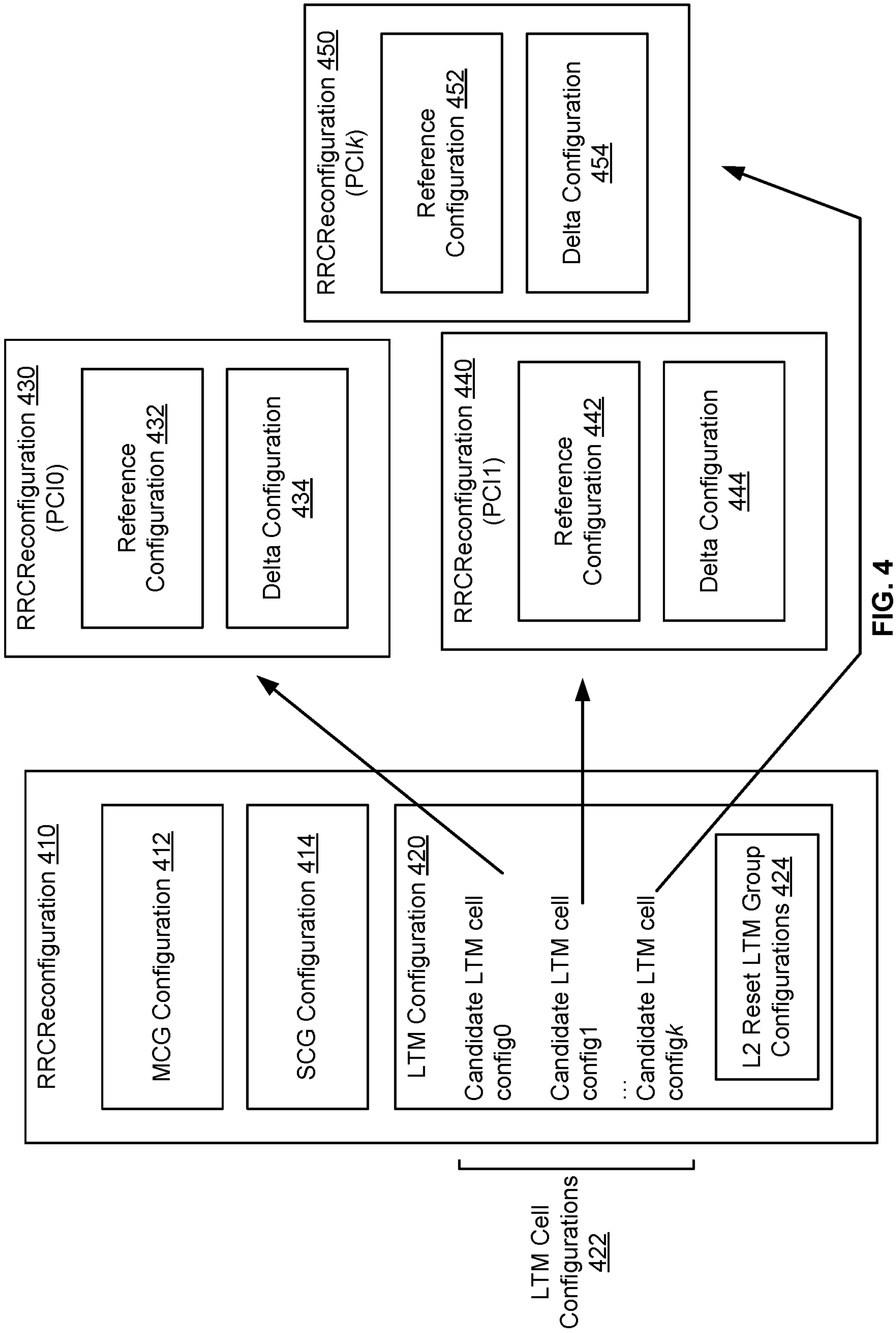
FIG. 4 illustrates an example of radio resource control configuration information, in accordance with some embodiments.

FIG. 4 illustrates an example of RRC configuration information, in accordance with some embodiments. The RRC configuration information can be received from a base station CU and can indicate, among other things, LTM cell configurations for candidate LTM cells and, separately, LTM cell group configurations (e.g., indicating that cells belonging to the group are LTM cells by being provided by the same base station DU).

In the example illustration of FIG. 4, the RRC configuration information indicates an RRCReconfiguration 410 that can be received from a gNB-CU of a base station (e.g., the gNB-CU 220). This RRCReconfiguration 410 includes, possibly, a master cell group (MCG) configuration 412 and a secondary cell group (SCG) configuration 414. The RRCReconfiguration 410 also includes an LTM configuration 420.

The LTM configuration 420 indicates the configuration of "k" candidate cells provided by the gNB-CU. Some of these candidate cells are provided by the same gNB-DU of the base station, whereas other candidate cells are provided by a different gNB-DU of the base station. These cells are candidate LTM cells. Referring back to FIG. 2, the gNB-CU 220 is connected to gNB-DUs 210 and 230 that in turn provide PCI0, PCI1, PCI3, PCI4, PCI5, and PCI6. As such "k" is six here (where PCI2 is not part of the provided cells). As such, the LTM configuration 420 indicates six LTM cell configurations 422, each of which corresponding to PCI0 (e.g., candidate LTM cell 212), PCI1 (e.g., candidate LTM cell 214), PCI3 (e.g., candidate LTM cell 216), PCI4 (e.g., candidate LTM cell 232), PCI5 (e.g., candidate LTM cell 234), and PCI6 (e.g., candidate LTM cell 236).

In addition, the LTM configuration 420 indicates an L2 reset LTM group configurations 424. In example, the L2 reset LTM group configurations 424 is indicated separately from the LTM cell configurations 422 (e.g., is not part of the LTM cell configurations 422). Generally, the L2 reset LTM group configurations 424 includes information indicating whether two or more candidate LTM cells belong to the same group of cells (e.g., are intra-DU cells provided by the same DU) or, otherwise, belong to different groups of cells (e.g., are inter-DU cells provided by different DUs). Referring back to FIG. 2, the L2 reset LTM group configurations 424 indicates that a first LTM association exists between PCI0 (e.g., candidate LTM cell 212), PCI1 (e.g., candidate LTM cell 214), PCI3 (e.g., candidate LTM cell 216) such that any handover from a source cell to a target cell belonging to this first group of candidate LTM cells can follow an intra-DU handover procedure that can skip a part or the entirety of an L2 reset. Further, the L2 reset LTM group configurations 424 indicates that a second LTM association exists between PCI4 (e.g., candidate LTM cell 232), PCI5 (e.g., candidate LTM cell 234), and PCI6 (e.g., candidate LTM cell 236) such that any handover from a source cell to a target cell belonging to this second group of candidate LTM cells can follow an intra-DU handover procedure that can skip a part or the entirety of an L2 reset. In comparison, the L2 reset LTM group configurations 424 indicates that no LTM associations exists between any cell of the first group and any cell from of the second group, such that any handover from a source cell of first group (or the second group) to a target cell of the second group (or the first group) can follow an inter-DU handover procedure that may not skip at least a part or the entirety of an L2 reset.

As further illustrated in FIG. 4, at least a part of the L2 reset LTM group configurations 424 can be spilled into each candidate LTM cell configuration. In particular, the first one of the LTM cell configurations 422 corresponds to a first LTM cell (e.g., PCI0), the second one of the LTM cell configurations 422 corresponds to a second LTM cell (e.g., PCI1), and so on until the kth one of the LTM cell configurations 422 corresponding to a kth LTM cell (e.g., PCI6). The first LTM cell (e.g., PCI0) can have a first RRC configuration 430 that includes a reference configuration 432 (e.g., one specific to this candidate LTM cell) and a delta configuration 434 (e.g., one that references the group of LTM cell to which the candidate LTM cell belongs and/or to the specific part of the L2 reset LTM group configurations 424 applicable to this candidate LTM cell). Similarly, the second LTM cell (e.g., PCI1) can have a second RRC configuration 440 that includes a reference configuration 442 (e.g., one specific to this candidate LTM cell) and a delta configuration 444 (e.g., one that references the group of LTM cell to which the candidate LTM cell belongs and/or to the specific part of the L2 reset LTM group configurations 424 applicable to this candidate LTM cell). Additionally, or alternatively, the kth LTM cell (e.g., PCI6) can have a kth RRC configuration 450 that includes a reference configuration 452 (e.g., one specific to this candidate LTM cell) and a delta configuration 454 (e.g., one that references the group of LTM cell to which the candidate LTM cell belongs and/or to the specific part of the L2 reset LTM group configurations 424 applicable to this candidate LTM cell). These and other configuration variations are further illustrated in the next figures.

Figure 5:
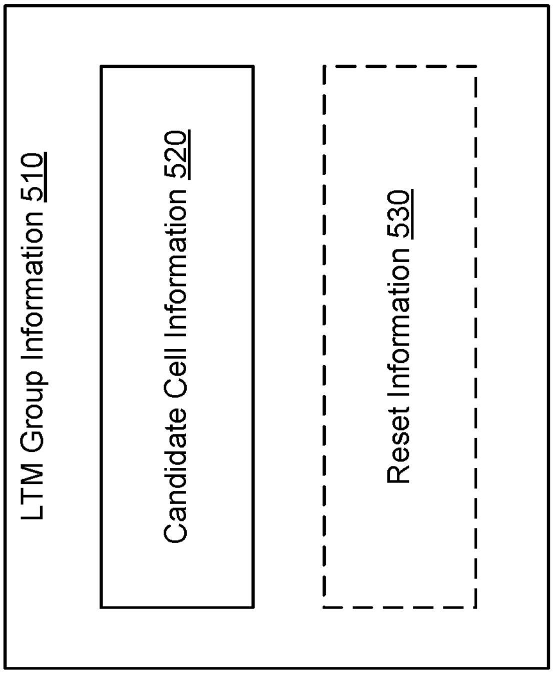
FIG. 5 illustrates an example of different types of information indicated in a RRC configuration, in accordance with some embodiments.

FIG. 5 illustrates an example of different types of information indicated in a RRC configuration, in accordance with some embodiments. In particular, the RRC configuration (e.g., RRCReconfiguration 410) includes two types of information: LTM group information 510 (e.g., a configuration of a group of candidate LTM cells, such as one or more of the L2 reset LTM group configurations 424) and candidate cell information 520 (e.g., information about a candidate LTM cell that belongs to this LTM cell group). The LTM group information 510 may not be a part of the configuration of the candidate LTM cells (e.g., cannot be included in the LTM cell configurations 422).

In an example, the LTM group information 510 corresponds to an explicit group configuration that is indicated by explicit signaling of groups (e.g., via RRC). Each group is signaled with the corresponding LTM association of the LTM cells. Different options can be used for an LTM association. A first option includes using candidate configuration identifiers of the candidate LTM cells (e.g., identifiers that uniquely identify the specific configurations from the LTM cell configurations 424). A second option includes using the physical cell identifiers (PCIs) of the candidate LTM cells and related absolute radio frequency channel number(s) (ARFCN(s)). In this example, for each group, the LTM group information 510 includes an identifier of the group. For cells that belong to the group, the candidate cell information 520 one or more candidate configuration identifiers of such cells, and/or PCIs and ARFCNs.

Referring back to FIG. 2 and using the candidate configuration identifiers, the group information 510 can be set as: {groupInfoID: 1; candidateConfig IDs: ID0, ID1, ID3} that corresponds to the group formed by the LTM cells 212, 214, and 216, {groupInfoID: 2; candidateConfig IDs: ID4, ID5, ID6} that corresponds to the group formed by the LTM cells 222, 224, and 226, and {groupInfoID:3; candidateConfig IDs: ID7, ID8} that corresponds to the group formed by the LTM cells 242 and 244. In this example "groupInfoID" can be listed in the group information 510, whereas the "candidateConfig IDs" can be listed in the candidate cell information 520.

In the context of a 5G NR system, the following information can be defined in a technical specification to capture the above approach for the explicit group configuration.

```
RRCReconfiguration-v1800-IEs ::= SEQUENCE {
  ltmMobilityConfig    LTM-MobilityConfig-v18xy OPTIONAL,    -- Need M
  ltmGroup       LTM-GroupConfig-v18xy OPTIONAL,    -- Need M
}
LTM-MobilityConfig-v18xy ::= SEQUENCE {
  LTM-MobilityCanididatesToRemoveList-r18 LTMCandidatesToRemoveList-r18
OPTIONAL,    -- Need N
  LTM-MobilityCanididatesToAddModList-r18 LTmCandidatesToAddModList-r18
OPTIONAL    -- Need N
}
LTMCandidatesToAddModList-r18 ::= SEQUENCE {
  LTMCandidateConfigList SEQUENCE (SIZE(1..maxL2Candidates))
OF    LTMCandidateConfig-r18 OPTIONAL,    -- Need M
}
LTMCandidateConfig-r18 ::= SEQUENCE {
  candidateConfigID-r18    INTEGER (1..maxLTMCandidates) OPTIONAL,
  candidateLTMConfig-r18    OCTET STRING (CONTAINING RRCReconfiguration-IEs)
OPTIONAL,
   ...
}
LTM-GroupConfig-v18xy ::= SEQUENCE {
```

-continued

```
  LTM-GroupToRemoveList-r18 LTM-GroupToRemoveList-r18 OPTIONAL,    -- Need N
  LTM-GroupToAddModList-r18 LTM-GroupToAddModList-r18 OPTIONAL      -- Need N
}
LTMC-GroupToAddModList-r18 ::= SEQUENCE {
  LTM-GroupList SEQUENCE (SIZE(1..maxL2Groups)) OF    LTM-GroupInfo-r18
OPTIONAL,   -- Need M
}
LTM-GroupInfo-r18 ::= SEQUENCE {
  groupInfoID-r18    INTEGER (1..maxLTMGroups) OPTIONAL,
  groupLTM-Cells—r18     SEQUENCE (SIZE(1..maxL2Candidates))
OF    candidateConfigID-r18 OPTIONAL,    -- Need M
  ...
}
```

As further illustrated in FIG. 5, the LTM group information 510 may optionally include reset information 530. Absent the reset information 530 being explicitly included in the LTM group information 510, a UE can determine that an L2 reset is to be performed when establishing a connection with a target cell if the LTM group information 510 does not indicate that the target cell and a source cell have an LTM association (e.g., as being part of the same group). Otherwise, no L2 reset may be performed.

In comparison, when the reset information 530 is included in the LTM group information 510, the reset information 530 can explicitly indicate whether the L2 reset is to be performed or not. Further, this indication can be granular to the possible L2 reset types (e.g., MAC reset, RLC reset, or any other type of L2 reset). As such, the group information 510 can include details of the L2 reset.

Referring back to FIG. 2 and using the candidate configuration identifiers, the group information 510 can be set as: {groupInfoID:1; candidateConfig IDs: ID0, ID1, ID3; Intra-DU L2Reset: MAC=False, RLC=False} that corresponds to the group formed by the LTM cells 212, 214, and 216, {groupInfoID:2; candidateConfig IDs: ID4, ID5, ID6; intra-DU L2Reset: MAC=False, RLC=False} that corresponds to the group formed by the LTM cells 222, 224, and 226,{groupInfoID:3; candidateConfig IDs: ID7, ID8; L2Reset: MAC=True, RLC=False}, and {inter-DU L2 Reset=L2Reset: MAC=True, RLC=True} that corresponds to the group formed by the LTM cells 242 and 244. In this example "groupInfoID" can be listed in the group information 510, whereas the "candidateConfig IDs" can be listed in the candidate cell information 520, and the "intra/inter-DU L2 Reset" can be listed in the reset information 530.

In the context of a 5G NR system, the following information can be defined in a technical specification to capture the above approach for the explicit group configuration including the explicit reset information.

```
RRCReconfiguration-v1800-IEs ::= SEQUENCE {
  ltmMobilityConfig      LTM-MobilityConfig-v18xy OPTIONAL,    -- Need M
  ltmGroup    LTM-GroupConfig-v18xy OPTIONAL,    -- Need M
}
LTM-MobilityConfig-v18xy ::= SEQUENCE {
  LTM-MobilityCanididatesToRemoveList-r18 LTMCandidatesToRemoveList-r18
OPTIONAL,    -- Need N
  LTM-MobilityCanididatesToAddModList-r18 LTmCandidatesToAddModList-r18
OPTIONAL    -- Need N
}
LTMCandidatesToAddModList-r18 ::= SEQUENCE {
  LTMCandidateConfigList SEQUENCE (SIZE(1..maxL2Candidates))
OF    LTMCandidateConfig-r18 OPTIONAL,    -- Need M
}
LTMCandidateConfig-r18 ::= SEQUENCE {
  candidateConfigID-r18    INTEGER (1..maxLTMCandidates) OPTIONAL,
  candidateLTMConfig-r18     OCTET STRING (CONTAINING RRCReconfiguration-IEs)
OPTIONAL,
  ...
}
LTM-GroupConfig-v18xy ::= SEQUENCE {
  LTM-GroupToRemoveList-r18 LTM-GroupToRemoveList-r18 OPTIONAL,    -- Need N
  LTM-GroupToAddModList-r18 LTM-GroupToAddModList-r18 OPTIONAL       -- Need N
}
LTMC-GroupToAddModList-r18 ::= SEQUENCE {
  LTM-GroupList SEQUENCE (SIZE(1..maxL2Groups)) OF LTM-GroupInfo-r18
OPTIONAL,    -- Need M
}
LTM-GroupInfo-r18 ::= SEQUENCE {
  groupInfoID-r18    INTEGER (1..maxLTMGroups) OPTIONAL,
  groupLTM-Cells—r18       SEQUENCE (SIZE(1..maxL2Candidates))
OF    candidateConfigID-r18 OPTIONAL,        -- Need M
  macReset       ENUMERATED {true} OPTIONAL
  rlcReset    ENUMERATED {true} OPTIONAL,
  ...
}
```

Figure 6:
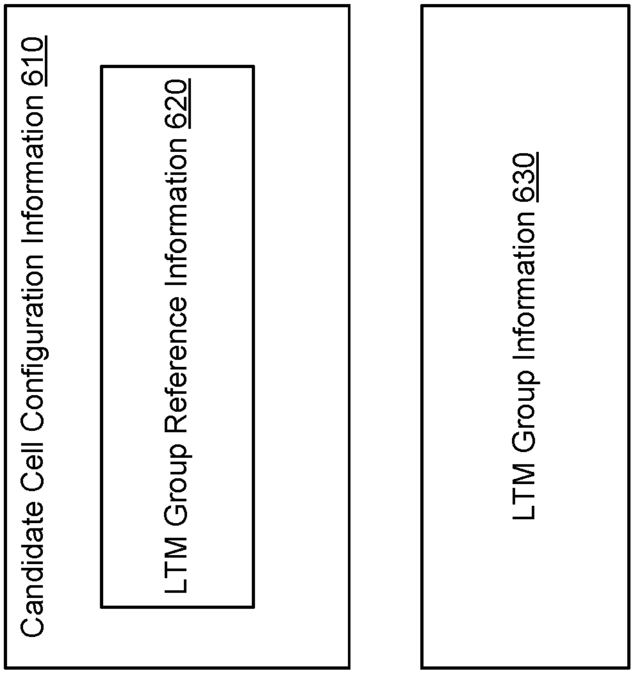
FIG. 6 illustrates another example of different types of information indicated in a RRC configuration, in accordance with some embodiments.

FIG. 6 illustrates another example of different types of information indicated in a RRC configuration, in accordance with some embodiments. In particular, the RRC configuration (e.g., RRCReconfiguration 410) includes two types of information: candidate cell configuration information 610 (e.g., information about a configuration of each candidate LTM cell, such as the LTM cell configurations 424) and LTM group reference information 620 (e.g., a reference to a group of candidate LTM cells or to a configuration of the group such as one or more of the L2 reset LTM group configurations 424). The LTM group configuration itself may not be a part of the candidate cell configuration information 610 (e.g., cannot be included in the LTM cell configurations 422).

In an example, each LTM candidate configuration includes in the candidate cell configuration information 610 corresponds to an LTM cell and includes a reference to the group of LTM cells to which this LTM cell belongs. In this example, a UE determines the current group to which its serving cell belongs, the group (which may be the same as the current group) to which a target cell belongs based on the LTM group reference information 620 and can look up LTM group information 630 (which can corresponds to the L2 reset LTM group configurations 424 and/or the LTM group information 510) to determine whether an L2 reset is needed or not. In particular, the LTM group information 630 can indicate whether an LTM association exists (e.g., in the case of the same group being determined) or not (e.g., in the case of different groups being determined) and/or can include an explicit indication of the L2 reset type(s) to be performed or avoided.

Referring back to FIG. 2 and using the candidate configuration identifiers, the candidate cell configuration information 610 can be set as: {LTM config; groupInfoID:1, 2, 3; LTM candidate 0: LTMconfig as RRCReconfiguration, candidate group ID: 1; LTM candidate 3: LTMconfig as RRCReconfiguration, candidate group ID: 1; LTM candidate 4: LTMconfig as RRCReconfiguration, candidate group ID: 2}. "LTM config" and "groupInfoID" can be listed in the candidate cell configuration information 610, whereas "LTM candidate" can be listed in the LTM group reference information 620. In this example, for the LTM cell 212 (e.g., PCI0), this cell has an LTM configuration indicated by the RRCconfiguraiton and belongs to the first group "1." So does the LTM cell 216 (e.g., PCI3). In comparison, the LTM cell 232 (e.g., PCI4) has an LTM configuration indicated by the RRCconfiguraiton and belongs to the first group "2." As such, the UE can determine that the LTM cells 212 and 216 are LTM associated in the same first group, whereas the LTM cell 232 is not LTM associated with LTM cells 212 and 216 but may be associated with other LTM cells in the second group. The LTM group information 630 can indicate the L2 reset details of these two groups.

In the context of a 5G NR system, the following information can be defined in a technical specification to capture the above approach for the explicit group configuration.

```
RRCReconfiguration-v1800-IEs ::= SEQUENCE {
   ltmMobilityConfig       LTM-MobilityConfig-v18xy OPTIONAL,    -- Need M
   ltmGroup       LTM-GroupConfig-v18xy OPTIONAL,    -- Need M
}
LTM-MobilityConfig-v18xy ::= SEQUENCE {
LTM-MobilityCanididatesToRemoveList-r18 LTMCandidatesToRemoveList-r18
OPTIONAL,    -- Need N
   LTM-MobilityCanididatesToAddModList-r18 LTmCandidatesToAddModList-r18
OPTIONAL    -- Need N
}
   LTMCandidatesToAddModList-r18 ::= SEQUENCE {
      LTMCandidateConfigList SEQUENCE (SIZE(1..maxL2Candidates))
OF LTMCandidateConfig-r18 OPTIONAL,    -- Need M
}
LTMCandidateConfig-r18 ::= SEQUENCE {
   candidateConfigID-r18    INTEGER (1..maxLTMCandidates) OPTIONAL,
   candidateLTMConfig-r18    OCTET STRING (CONTAINING RRCReconfiguration-IEs)
OPTIONAL,
   candidateGroupID-r18    LTM-GroupInfo-r18 OPTIONAL,    -- Need M
   ...
}
LTM-GroupConfig-v18xy ::= SEQUENCE {
   LTM-GroupToRemoveList-r18 LTM-GroupToRemoveList-r18 OPTIONAL,    -- Need N
   LTM-GroupToAddModList-r18 LTM-GroupToAddModList-r18 OPTIONAL    -- Need N
}
LTMC-GroupToAddModList-r18 ::= SEQUENCE {
   LTM-GroupList SEQUENCE (SIZE(1..maxL2Groups)) OF    LTM-GroupInfo-r18
OPTIONAL,    -- Need M
}
LTM-GroupInfo-r18 ::= SEQUENCE {
   groupInfoID-r18       INTEGER (1..maxLTMGroups) OPTIONAL,
   ...
}
```

In the above example, the grouping of LTM cells is based on linkage. In particular, each LTM cell has an LTM cell configuration that includes a reference to the group to which the LTM cell belongs. Further, in the above example, the linkage is explicit, where the reference to the group is included as separate information in the LTM cell configuration (e.g., the LTM group reference information 620 is included in but is separate from the candidate cell configuration information 610). However, other examples are possible, where the linkage can be implicit. For example, the reference to the group need not be separate from the LTM cell configuration and can instead be embedded in this configuration.

Referring back to FIG. 2 and using the candidate configuration identifiers, the implicit linkage can be defined by setting the candidate cell configuration information 610 set as: {LTM config; groupInfoID: 1, 2, 3; LTM candidate 0: LTMconfig as RRCReconfiguration; LTM candidate 3: LTMconfig as RRCReconfiguration; LTM candidate 4: LTMconfig as RRCReconfiguration}. "LTM config" and "groupInfoID" can be listed in the candidate cell configuration information 610. The RRCReconfiguration of each of these cells can embed the corresponding candidate group identifier (e.g., "candidate group ID: 1" is included in the RRCReconfiguration of the LTM cell 212 (e.g., PCI0) and LTM cell 216 (e.g., PCI3), and "candidate group ID:2" is included in the RRCReconfiguration of the LTM cell 232 (e.g., PCI4)).

In the context of a 5G NR system, the following information can be defined in a technical specification to capture the above approach for the implicit linkage.

sponds to one or more configurations of one or more other LTM groups. If an LTM cell is not explicitly indicated as belonging to any of the other LTM groups, the UE can assume that this LTM cell belongs to the default group. The explicit indication can follow the approach of FIG. 5 (e.g., an identifier of an LTM cell configuration and/or a PCI of the LTM cell being included in a configuration of an LTM group) or the approach of FIG. 6 (e.g., by using linkage in the LTM cell configuration). The former approach is further described in FIG. 7, whereas the latter approach is shown in FIG. 8.

Practically (and usually), the configuration is such that, the current DU has many serving TRPs, while the TRPs/cells that are in proximity to the current DU, would be linked via CU (e.g., correspond inter-DU TRPs/cells). As such, a

```
SpCellConfig ::= SEQUENCE {
  servCellIndex    ServCellIndex OPTIONAL,    -- Cond SCG
  reconfigurationWithSync    ReconfigurationWithSync OPTIONAL,    -- Cond
ReconfWithSync
  rlf-TimersAndConstants CHOICE {
    release NULL,
    setup    RLF-TimersAndConstants
} OPTIONAL,    -- Need M
rlmInSyncOutOfSyncThreshold    ENUMERATED {n1} OPTIONAL,    -- Need S
spCellConfigDedicated    ServingCellConfig OPTIONAL,    -- Need M
  ...,
  [[
    lowMobilityEvaluationConnected-r17 SEQUENCE {
      s-SearchDeltaP-Connected-r17 ENUMERATED {dB3, dB6, dB9, dB12, dB15, spare3,
spare2, spare1},
      t-SearchDeltaP-Connected-r17 ENUMERATED {
        s5,
        s10,
        s20,
        s30,
        s60,
        s120,
        s180,
        s240,
        s300,
        spare7,
        spare6,
        spare5,
        spare4,
        spare3,
        spare2,
        spare1
      }
    } OPTIONAL,    -- Need R
  goodServingCellEvaluationRLM-r17    GoodServingCellEvaluation-r17 OPTIONAL, --
Need R
  goodServingCellEvaluationBFD-r17    GoodServingCellEvaluation-r17 OPTIONAL, --
Need R
  deactivatedSCG-Config-r17 CHOICE {
      release NULL,
      setup    DeactivatedSCG-Config-r17
    } OPTIONAL,    -- Cond SCG-Opt
  ]],
  [[
    ltmConfiguration-r18    LTM-Configuration-r18 OPTIONAL,
  ]]
}
LTM-Configuration-r18 ::= SEQUENCE {
  candidateGroupID-r18    LTM-GroupInfo-r18 OPTIONAL,    -- Need M
  ...
}
```

Figure 7:
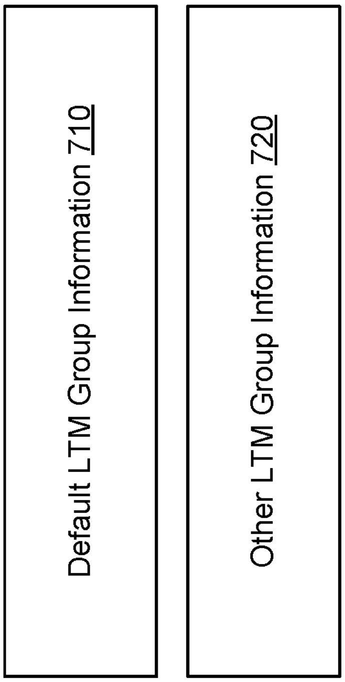
FIG. 7 illustrates another example of different types of information indicated in a RRC configuration, in accordance with some embodiments.
Figure 8:
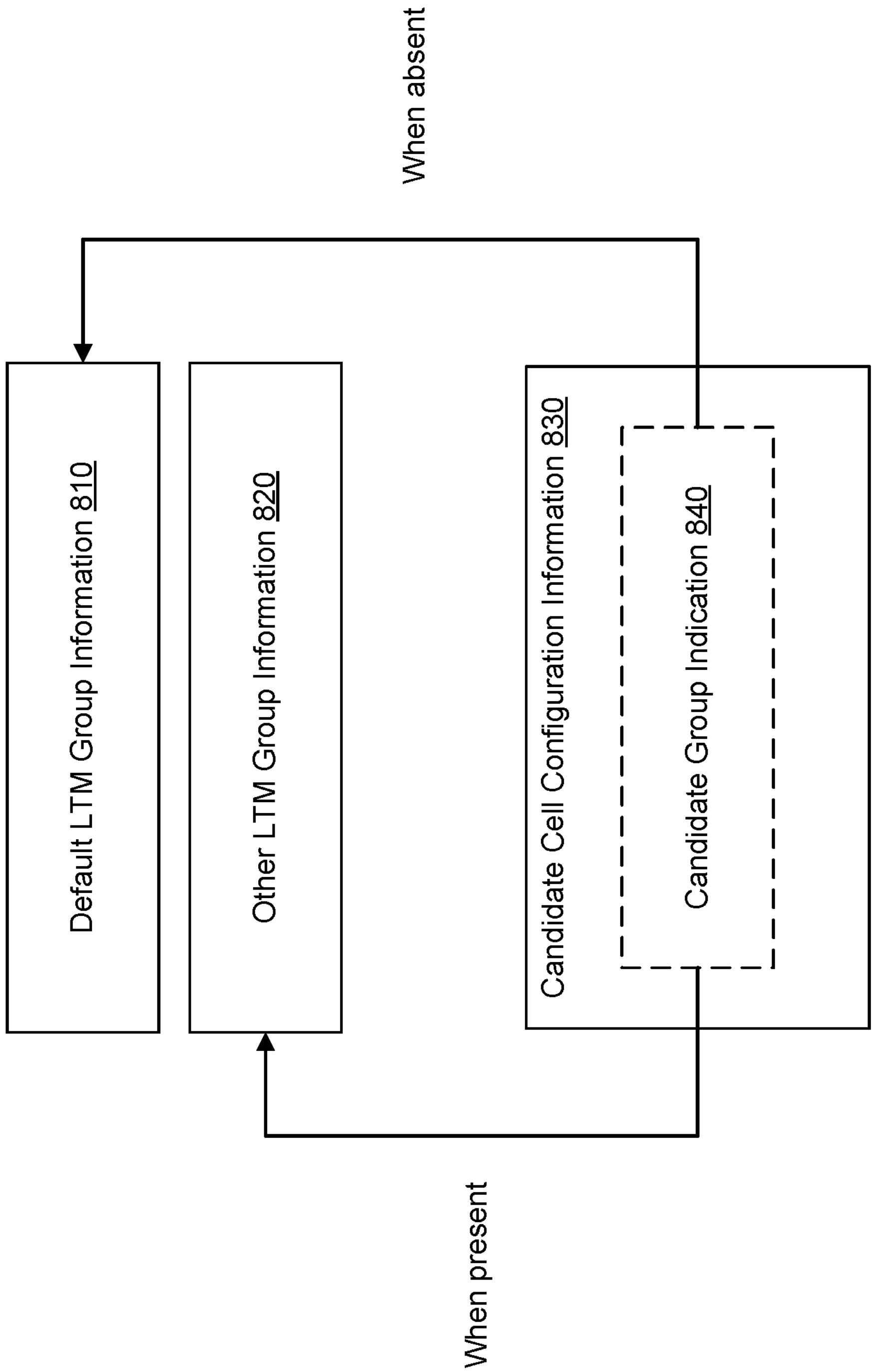
FIG. 8 illustrates another example of different types of information indicated in a RRC configuration, in accordance with some embodiments.

FIG. 7 illustrates another example of different types of information indicated in a RRC configuration, in accordance with some embodiments. In this example, the RRC configuration indicates a default LTM group information 710 and other LTM group information 720. The default LTM group information 710 corresponds to a configuration of a default LTM group. The other LTM group information 720 correnumber of PCIs could be part of the serving DU, whereas the number of inter-DU PCIs is relatively smaller. Referring back to FIG. 2, this is shown by considering the example of the serving DU being gNB-DU 210. In this example, the UE 204 is connected under PCI3 and is in proximity to the TRPs having PCI0, PCI1, PCI3, and PCI4. As such, an intra-DU hadover has two possible cells corresponding to PCI0 and PCI1, whereas an inter-DU handover has possibly one cell corresponding to PCI4 (the other cells corresponding to PCI5 and PCI6 are not in proximity to the UE such that they can be considered candidate cells). As such, the number of intra-DU cells is larger than that of inter-DU cells.

Accordingly, all LTM candidate cells can be considered as belonging to the same DU group (e.g., the default LTM group), unless explicitly signaled (e.g., the absence of group info is to be construed as part of default/same group).

Referring back to FIG. 2 and using the candidate configuration identifiers, the default grouping can be defined by setting the default LTM group information 710 set as: {groupInfoID: 1}. No LTM cell configuration identifiers are explicitly signaled in the default LTM group information 710. In comparison, the other LTM group information 7120 can be set as {groupInfoID: 2; candidateConfig IDs: ID4, ID5, ID6} that corresponds to the group formed by the LTM cells 222, 224, and 226, and {groupInfoID:3; candidateConfig IDs: ID7, ID8} that corresponds to the group formed by the LTM cells 242 and 244. In this example because the identifiers of the LTM cell configurations of the cells 212 and 214 are not explicitly indicated in any of the groups, these cells 212 and 214 are assumed to belong to the default group (e.g., "groupInfoID: 1").

FIG. 8 illustrates another example of different types of information indicated in a RRC configuration, in accordance with some embodiments. Here, the RRC configuration indicates linkage between an LTM cell configuration and an LTM group. If the linkage is omitted from the LTM cell configuration, the corresponding cell is assumed to belong to the default group.

As illustrated, the RRC configuration indicates default LTM group information 810 and other LTM group information 820. In turn, the default LTM group information 810 corresponds to a configuration of a default LTM group, whereas the other LTM group information 820 corresponds to one or more configurations of one or more other LTM groups. Further, the RRC configuration indicates candidate cell configuration information 830. In turn, the candidate cell configuration information 830, indicates for each candidate cell, a configuration of this cell and can include a candidate group indication 840 (separately or embedded in the configuration). As illustrated with the dashed box, the candidate group indication 840 can be present or absent. If present, the candidate group indication 840 can be a reference to any of the other LTM groups (e.g., by being an identifier of this group or an identifier of the configuration of this group). The absence of the candidate group indication 840 can be an implicit linkage to the default LTM group.

Referring back to FIG. 2 and using the candidate configuration identifiers, the candidate group indication 840 can be defined by setting the candidate cell configuration information 830 set as: {LTM config; groupInfoID: 1, 2, 3; LTM candidate 0: LTMconfig as RRCReconfiguration; LTM candidate 3: LTMconfig as RRCReconfiguration; LTM candidate 4: LTMconfig as RRCReconfiguration, candidate group ID: 2}. Here, the default LTM group has "groupInfoID: 1." The LTM cell configuration of the cell 212 is defined in "LTM candidate 0" but does not include a reference to any LTM group. As such, this cell 212 is assumed to belong to the default group "groupInfoID: 1." Similarly, the LTM cell configuration of the cell 216 is defined in "LTM candidate 3" but does not include a reference to any LTM group. As such, this cell 216 is assumed to belong to the default group "groupInfoID: 1."

Figure 9:
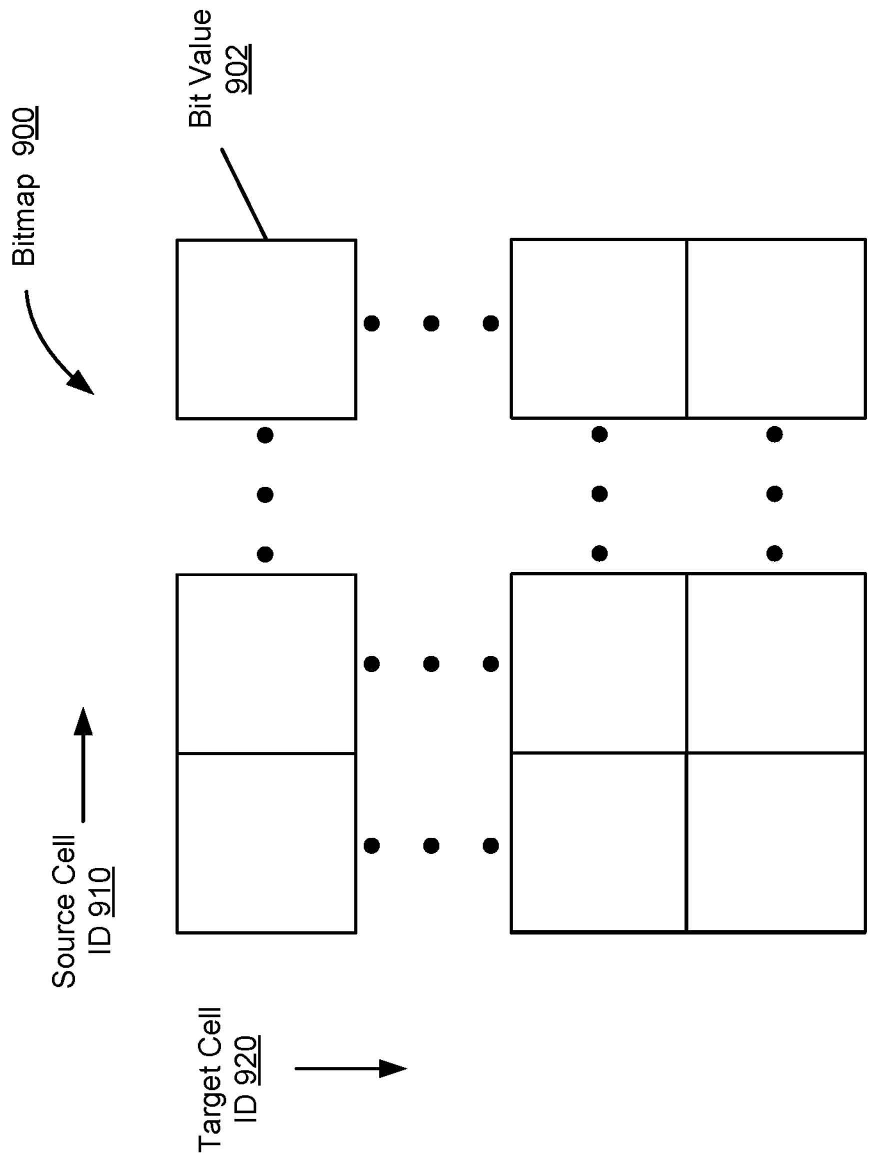
FIG. 9 illustrates another example of different types of information indicated in a RRC configuration, in accordance with some embodiments.

FIG. 9 illustrates another example of different types of information indicated in a RRC configuration, in accordance with some embodiments. In this example, the RRC configuration indicates a bitmap 900, where each bit value in the bitmap 900 corresponds to a pair of source cell and target cell and indicates whether these two cells are LTM associated. The bit value can be set using one or more bits. If a single bit is used, the bit can be set to "1" to indicate an LTM association, whereby a UE can forego performing an L2 reset (e.g., as part of handover from the source cell to the target cell). Conversely, the bit can be set to "0" to indicate that the L2 reset is needed (e.g., in case the two cells are not LTM associated as being part of the same DU). If multiple bits are used, a more granular indication of the L2 reset type becomes possible. For example, a first bit can be set to indicate whether a MAC CE is to be performed or not, whereas a second bit can be set to indicate whether an RLC CE is to be performed or not. Alternatively, multiple bitmaps (each similar to the bitmap 900) can be used, where each bit map corresponds to an L2 reset type (e.g., one corresponds to MAC reset and another one corresponds to RLC reset).

In the example illustration of FIG. 9, the bitmap 900 can be considered as a two-dimensional bitstring (e.g., a table). Rows of the bitmap 900 correspond to source cell identifiers 910, whereas columns of the bitmap 900 correspond to target cell identifiers 910. Referring back to FIG. 2, the first row can correspond to PCI0, whereas the third and fourth columns can correspond to PCI3 and PCI4, respectively. In this example, the bit value of the intersection between the first row and the third column can be set to indicate that PCI0 and PCI3 are part of the same LTM group and, thus, the L2 reset can be foregone. In comparison, the bit value of the intersection between the first row and the fourth column can be set to indicate that PCI0 and PCI4 are part of the different LTM groups and, thus, the L2 reset should be performed.

The above bitmap 900 is an example of a two dimensional bitstring. Other forms of bitstrings are possible. For example, a network may only provide a bitstring of length <maxLTMCandidates×maxLTMCandidates>. A UE simply check the corresponding bit in the position of <srcConfigID×maxLTMCandidates+targetConfigID> in this bit string to determine the L2 reset information. If the bit is "1," then there is a need of L2 reset. If the bit is "0," then there is no need of L2 reset. In this way, the network can hide the group logic and intra/inter DU difference form the UE. The data structure is also simpler with the absence of group level information. If the source and target LTM candidates are within the same LTM group, the value would be "0." For an L2 reset granularity that separately indicates the need for a MAC reset and/or RLC reset, two of such bitstrings can be used, where one of the corresponds to the MAC reset and the other one corresponds to the RLC reset.

In another example, the network configures a single "L2-Reset-Distance" threshold for L2 reset. This threshold distance (which can be a positive integer) can be included in the RRC configuration. The UE can implement logic to determine whether an L2 reset is needed depending on a difference between a configuration identifier of a source cell and a configuration identifier of a target cell and how this difference compares to the threshold distance. If equal to or less than the threshold distance, no L2 reset needs to be performed. If larger than the threshold distance, the L2 reset should be performed. As such, the UE's logic can be implemented as "if abs(SrcConfigID−TargetConfigID) ≤L2ResetDistance, then there is no L2 reset; Otherwise, there is L2 Reset." With this knowledge of this threshold, the network can carefully allocate the "ConfigIDs" to ensure the candidateConfigID for PCI(s) under different DUs are spaced sufficiently (e.g., being larger than the threshold).

Figure 10:
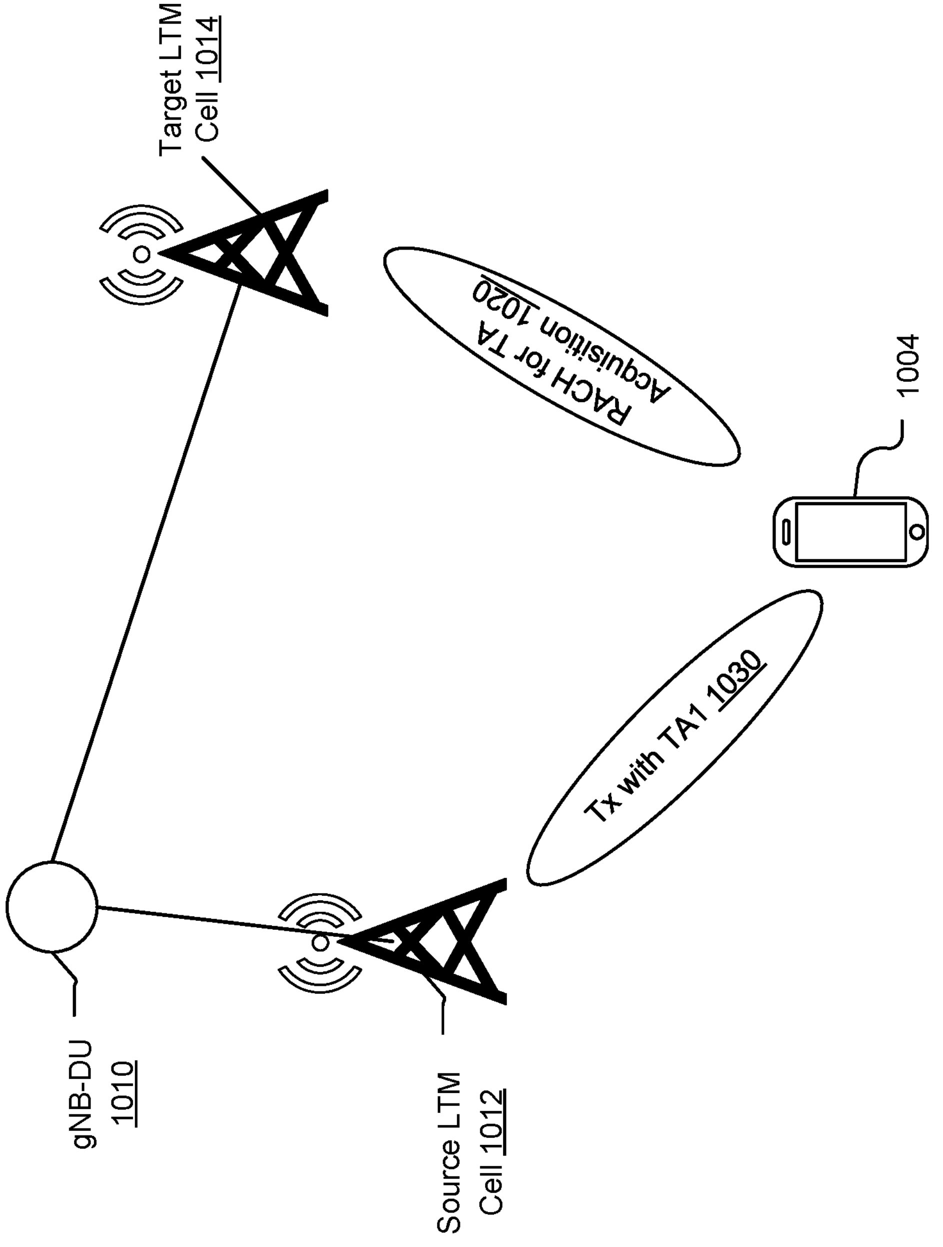
FIG. 10 illustrates an example of timing advance reception, in accordance with some embodiments.

FIG. 10 illustrates an example of timing advance reception, in accordance with some embodiments. As shown, a gNB-DU 1010 (or, more generally, a base station DU) provides a source LTM cell 1012 (e.g., via a first TRP) and a target LTM cell 1014 (via a second TRP). A UE 1004 can be connected with the gNB-DU 1010 via the source LTM cell 1012 (e.g., the source LTM cell 1012 is the current serving cell). The UE 1004 can then establish a second connection with the gNB-DU 1010 via the target LTM cell 1014 (e.g., in response to a MAC CE handover command). As part of establishing this connection, the UE 1004 can send a random access channel (RACH) message 1020 via the target LTM cell 1014 for different purposes. For example, the RACH message can be for timing advance (TA) acquisition. Because the target LTM cell 1014 and the source LTM cell 1012 are LTM associated by being provided by the same gNB-DU 1010, the TA information (e.g., the TA value) can be sent in a random access response (RAR) 1030 by the gNB-DU via the source LTM cell 1012 instead of the target LTM cell 1014. Additionally or alternatively, the TA value can sent by the gNB-DU via the source LTM using a message other than the RAR (e.g., another MAC CE). This approach can improve the communication efficiency. However, if no LTM association exists between a target cell and a source cell (such as when these two cells are not provided by the same base station DU), the RAR response is sent via the target cell.

According to embodiments of the present disclosure, because a means is provided for the UE 1004 to know if the target LTM candidate cell is part of the same DU or not, it is possible to determine whether the candidate LTM cell for which the UE 1004 has RACHed is part of the current serving DU or not. If the target LTM cell on which the UE 1004 has RACHed for TA acquisition is part of the same DU as the source LTM cell, the UE 1004 can assume that the RAR is provided on the source LTM cell itself. This assumption can be made without any configuration of the UE 1004 by the network (e.g., by being predefined in a technical specification). Alternatively, the network can configure (e.g., via RRC signaling) the UE 1004 to assume such association so RAR reception at the UE for TA acquisition is based on the grouping configuration for L2 reset.

Figure 11:
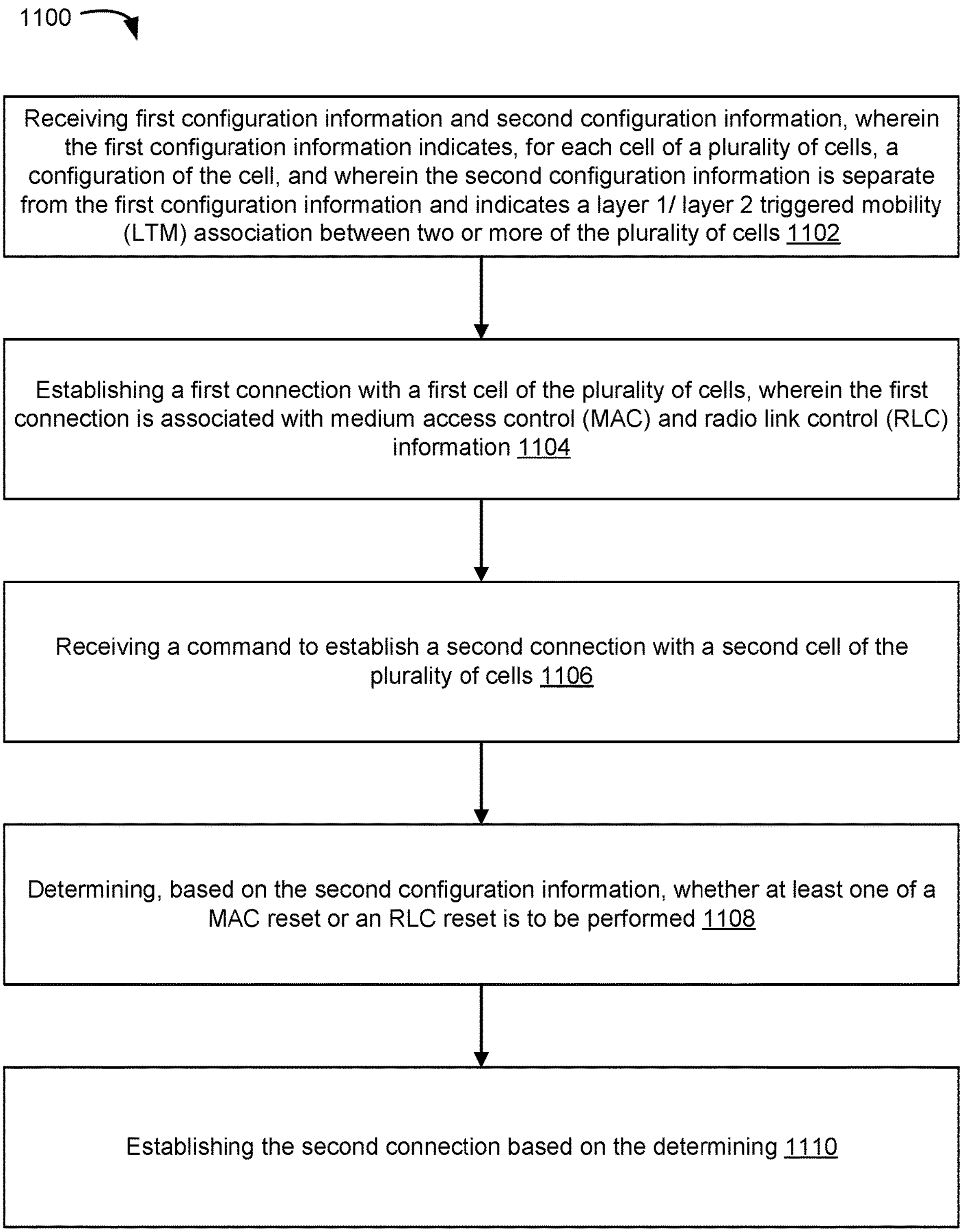
FIG. 11 illustrates an example of an operational flow/algorithmic structure implemented by a UE to establish one or more connections with a network, in accordance with some embodiments.

FIG. 11 illustrates an example of an operational flow/algorithmic structure 1100 implemented by a UE to establish one or more connections with a network, in accordance with some embodiments. The UE is an example of any of the UEs described in the present disclosure.

The operational flow/algorithmic structure 1100 may include, at 1102, receiving first configuration information and second configuration information, wherein the first configuration information indicates, for each cell of a plurality of cells, a configuration of the cell, and wherein the second configuration information is separate from the first configuration information and indicates a layer 1/layer 2 triggered mobility (LTM) association between two or more of the plurality of cells. For example, the first configuration includes LTM cell configurations for each one of the plurality of cells and is received via RRC signaling from a base station CU. The second configuration includes LTM group configurations for each group of LTM cells provided by a same base station DU and is received via RRC signaling from the base station CU.

The operational flow/algorithmic structure 1100 may include, at 1104, establishing a first connection with a first cell of the plurality of cells, wherein the first connection is associated with medium access control (MAC) and radio link control (RLC) information. For example, the first cell is a serving cell and the first connection is established according to an RRC connection procedure or RRC reconnection procedure.

The operational flow/algorithmic structure 1100 may include, at 1106, receiving a command to establish a second connection with a second cell of the plurality of cells. For example, the second cell is a target cell and the command is a MAC CE handover command that indicates the target cell.

The operational flow/algorithmic structure 1100 may include, at 1108, determining, based on the second configuration information, whether at least one of a MAC reset or an RLC reset is to be performed. For example, the UE can determine, by at least using the second configuration information, whether the target cell and the serving cell belong to a same LTM group (e.g., are provided by the same base station DU). If so, the UE can determine that no L2 reset is needed. Otherwise, the UE can determine that an L2 reset is needed and the type of this reset (e.g., MAC reset only, RLC reset only, or both MAC reset and RLC reset).

The operational flow/algorithmic structure 1100 may include, at 1110, establishing the second connection based on the determining. For example, if no L2 reset is needed, the UE establishes the second connection without removing existing L2 information. Otherwise, if the MAC reset and/or the RLC reset, the UE can remove the related L2 information.

Figure 12:
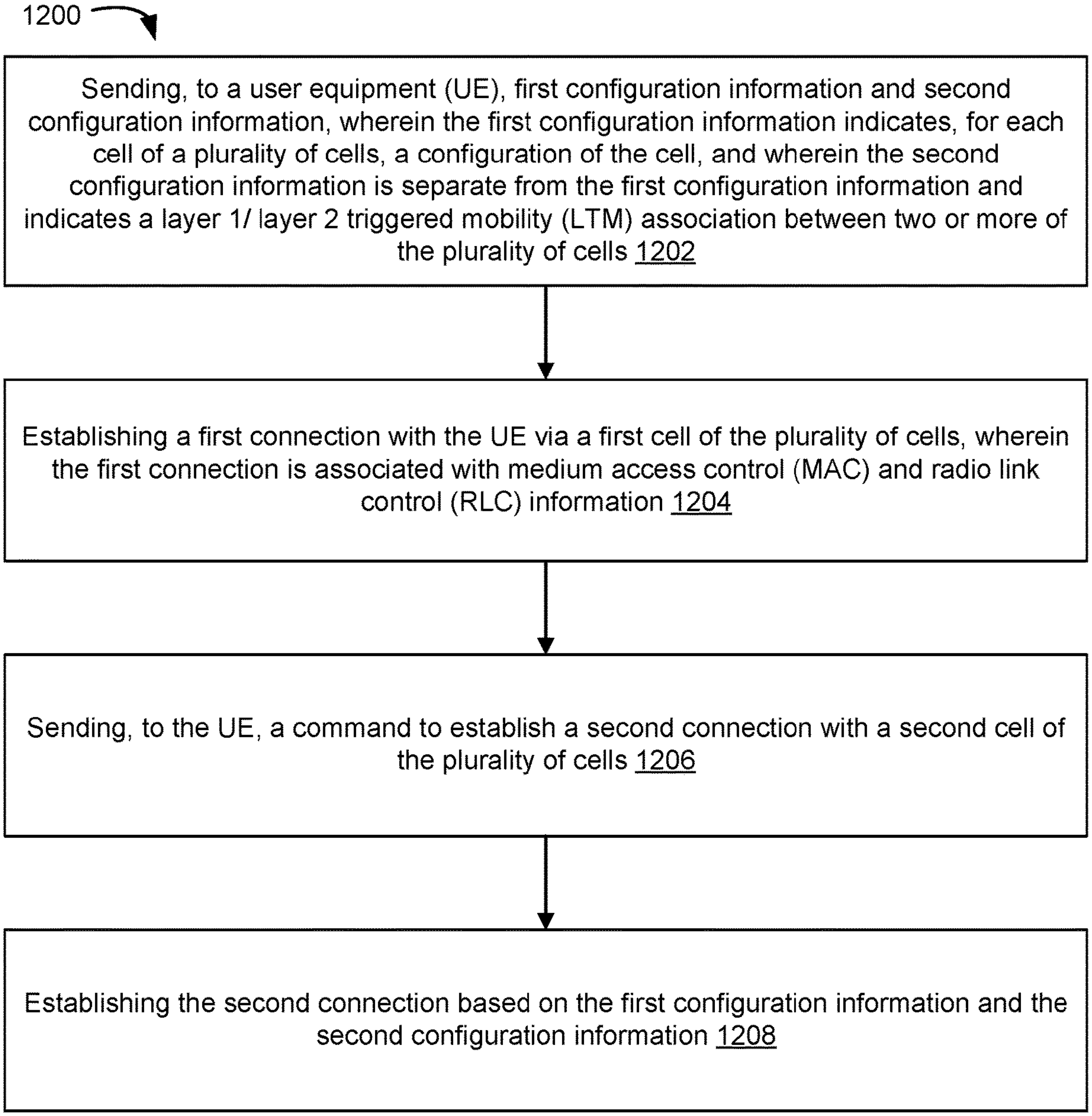
FIG. 12 illustrates an example of an operational flow/algorithmic structure implemented by a network to establish one or more connections with a UE, in accordance with some embodiments.

FIG. 12 illustrates an example of an operational flow/algorithmic structure 1200 implemented by a network to establish one or more connections with a UE, in accordance with some embodiments. The network is an example of any of the networks described in the present disclosure.

The operational flow/algorithmic structure 1200 may include, at 1202, sending, to a user equipment (UE), first configuration information and second configuration information, wherein the first configuration information indicates, for each cell of a plurality of cells, a configuration of the cell, and wherein the second configuration information is separate from the first configuration information and indicates a layer 1/layer 2 triggered mobility (LTM) association between two or more of the plurality of cells. For example, the first configuration includes LTM cell configurations for each one of the plurality of cells and is sent via RRC signaling from a base station CU. The second configuration includes LTM group configurations for each group of LTM cells provided by a same base station DU and is sent via RRC signaling from the base station CU.

The operational flow/algorithmic structure 1200 may include, at 1204, establishing a first connection with the UE via a first cell of the plurality of cells, wherein the first connection is associated with medium access control (MAC) and radio link control (RLC) information. For example, the first cell is a serving cell and the first connection is established according to an RRC connection procedure or RRC reconnection procedure.

The operational flow/algorithmic structure 1200 may include, at 1206, sending, to the UE, a command to establish a second connection with a second cell of the plurality of cells. For example, the second cell is a target cell and the command is a MAC CE handover command that indicates the target cell.

The operational flow/algorithmic structure 1200 may include, at 1208, establishing the second connection based on the first configuration information and the second configuration information. For example, the UE can determine, by at least using the second configuration information, whether the target cell and the serving cell belong to a same LTM group (e.g., are provided by the same base station DU).

If so, the UE can determine that no L2 reset is needed. Otherwise, the UE can determine that an L2 reset is needed and the type of this reset (e.g., MAC reset only, RLC reset only, or both MAC reset and RLC reset). If no L2 reset is needed, the second connection without removing existing L2 information. Otherwise, if the MAC reset and/or the RLC reset, the related L2 information can remove the related L2 information and the base station CU can send anew such information to the UE via the target cell.

Figure 13:
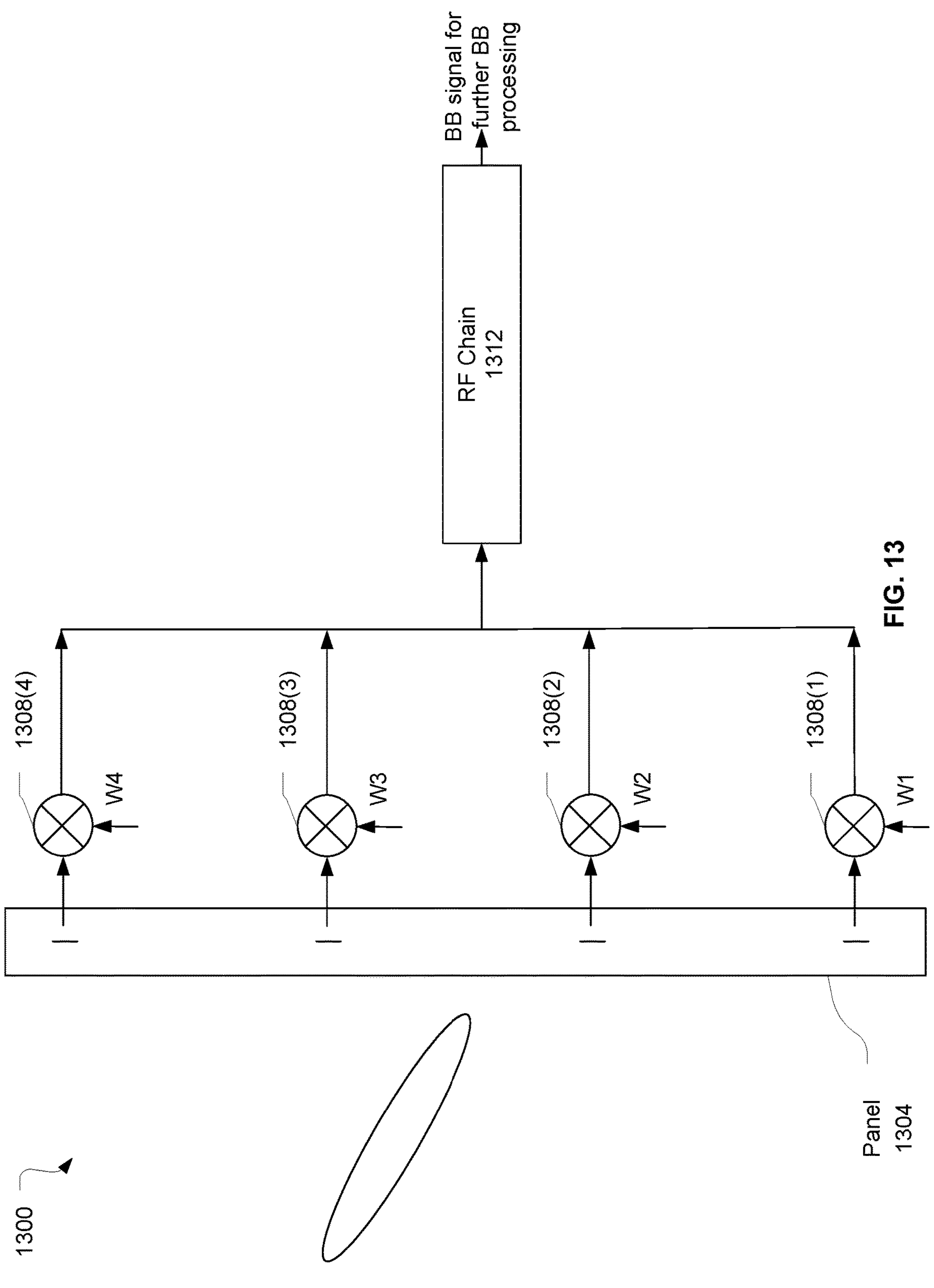
FIG. 13 illustrates an example of receive components, in accordance with some embodiments.

FIG. 13 illustrates receive components 1300 of, for example, a UE or a base station, in accordance with some embodiments. The receive components 1300 may include an antenna panel 1304 that includes a number of antenna elements. The panel 1304 is shown with four antenna elements, but other embodiments may include other numbers.

The antenna panel 1304 may be coupled to analog beamforming (BF) components that include a number of phase shifters 1308(1)-1308(4). The phase shifters 1308(1)-1308(4) may be coupled with a radio-frequency (RF) chain 1312. The RF chain 1312 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1308(1)-1308(4) to provide a receive beam at the antenna panel 1304. These BF weights may be determined based on the channel-based beamforming.

Figure 14:
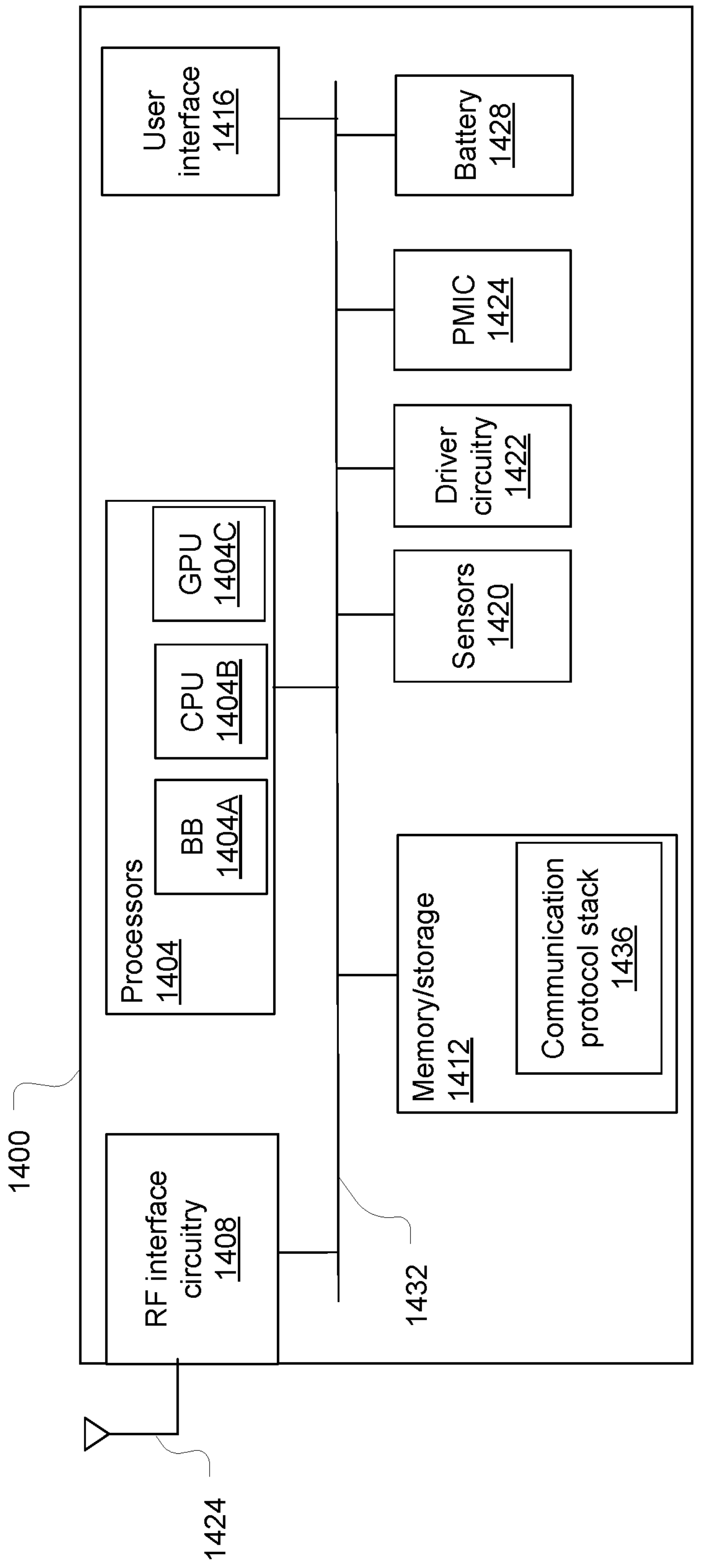
FIG. 14 illustrates an example of a UE, in accordance with some embodiments.

FIG. 14 illustrates a UE 1400, in accordance with some embodiments. The UE 1400 may be similar to and substantially interchangeable with any of the UEs described herein above.

Similar to that described above with respect to UE 144, the UE 1400 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1400 may include processors 1404, RF interface circuitry 1408, memory/storage 1412, user interface 1416, sensors 1420, driver circuitry 1422, power management integrated circuit (PMIC) 1424, and battery 1428. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangements of the components shown may occur in other implementations.

The components of the UE 1400 may be coupled with various other components over one or more interconnects 1432, which may represent any type of interface, input/output, bus (local, system, or expansion), transmission line, trace, optical connection, etc. that allows various circuit components (on common or different chips or chipsets) to interact with one another.

The processors 1404 may include processor circuitry, such as baseband processor circuitry (BB) 1404A, central processor unit circuitry (CPU) 1404B, and graphics processor unit circuitry (GPU) 1404C. The processors 1404 may include any type of circuitry or processor circuitry that executes or otherwise operates computer-executable instructions, such as program code, software modules, or functional processes from memory/storage 1412 to cause the UE 1400 to perform operations as described herein.

In some embodiments, the baseband processor circuitry 1404A may access a communication protocol stack 1436 in the memory/storage 1412 to communicate over a 3GPP compatible network. In general, the baseband processor circuitry 1404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1408.

The baseband processor circuitry 1404A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1404A may also access group information from memory/storage 1412 to determine search space groups in which a number of repetitions of a PDCCH may be transmitted.

The memory/storage 1412 may include any type of volatile or non-volatile memory that may be distributed throughout the UE 1400. In some embodiments, some of the memory/storage 1412 may be located on the processors 1404 themselves (for example, L1 and L2 cache), while other memory/storage 1412 is external to the processors 1404 but accessible thereto via a memory interface. The memory/storage 1412 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1408 may include transceiver circuitry and a radio frequency front module (RFEM) that allows the UE 1400 to communicate with other devices over a radio access network. The RF interface circuitry 1408 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1450 and proceed to filter and amplify (with a low-noise amplifier) the signal. The signal may be provided to a receiver of the transceiver that down-converts the RF signal into a baseband signal that is provided to the baseband processor of the processors 1404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1450.

In various embodiments, the RF interface circuitry 1408 may be configured to transmit/receive signals in a manner compatible with NR access technologies.

The antenna 1450 may include a number of antenna elements that each convert electrical signals into radio waves to travel through the air and to convert received radio waves into electrical signals. The antenna elements may be arranged into one or more antenna panels. The antenna 1450 may have antenna panels that are omnidirectional, directional, or a combination thereof to enable beamforming and multiple input, multiple output communications. The antenna 1450 may include microstrip antennas, printed antennas fabricated on the surface of one or more printed circuit boards, patch antennas, phased array antennas, etc. The antenna 1450 may have one or more panels designed for specific frequency bands including bands in FR1 or FR2.

The user interface circuitry 1416 includes various input/output (I/O) devices designed to enable user interaction with the UE 1400. The user interface 1416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs) and multi-character visual outputs, or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1400.

The sensors 1420 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1422 may include software and hardware elements that operate to control particular devices that are embedded in the UE 1400, attached to the UE 1400, or otherwise communicatively coupled with the UE 1400. The driver circuitry 1422 may include individual drivers allowing other components to interact with or control various input/output (I/O) devices that may be present within, or connected to, the UE 1400. For example, driver circuitry 1422 may include a display driver to control and allow access to a display device, a touchscreen driver to control and allow access to a touchscreen interface, sensor drivers to obtain sensor readings of sensor circuitry 1420 and control and allow access to sensor circuitry 1420, drivers to obtain actuator positions of electro-mechanic components or control and allow access to the electro-mechanic components, a camera driver to control and allow access to an embedded image capture device, audio drivers to control and allow access to one or more audio devices.

The PMIC 1424 may manage power provided to various components of the UE 1400. In particular, with respect to the processors 1404, the PMIC 1424 may control power-source selection, voltage scaling, battery charging, or DC-to-DC conversion.

In some embodiments, the PMIC 1424 may control, or otherwise be part of, various power saving mechanisms of the UE 1400. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1400 may power down for brief intervals of time and thus save power. If there is no data traffic activity for an extended period of time, then the UE 1400 may transition off to an RRC_Idle state, where it disconnects from the network and does not perform operations, such as channel quality feedback, handover, etc. The UE 1400 goes into a very low power state and it performs paging where again it periodically wakes up to listen to the network and then powers down again. The UE 1400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1428 may power the UE 1400, although in some examples the UE 1400 may be mounted deployed in a fixed location and may have a power supply coupled to an electrical grid. The battery 1428 may be a lithium-ion battery, a metal-air battery, such as a zinc-air battery, an aluminum-air battery, a lithium-air battery, and the like. In some implementations, such as in vehicle-based applications, the battery 1428 may be a typical lead-acid automotive battery.

Figure 15:
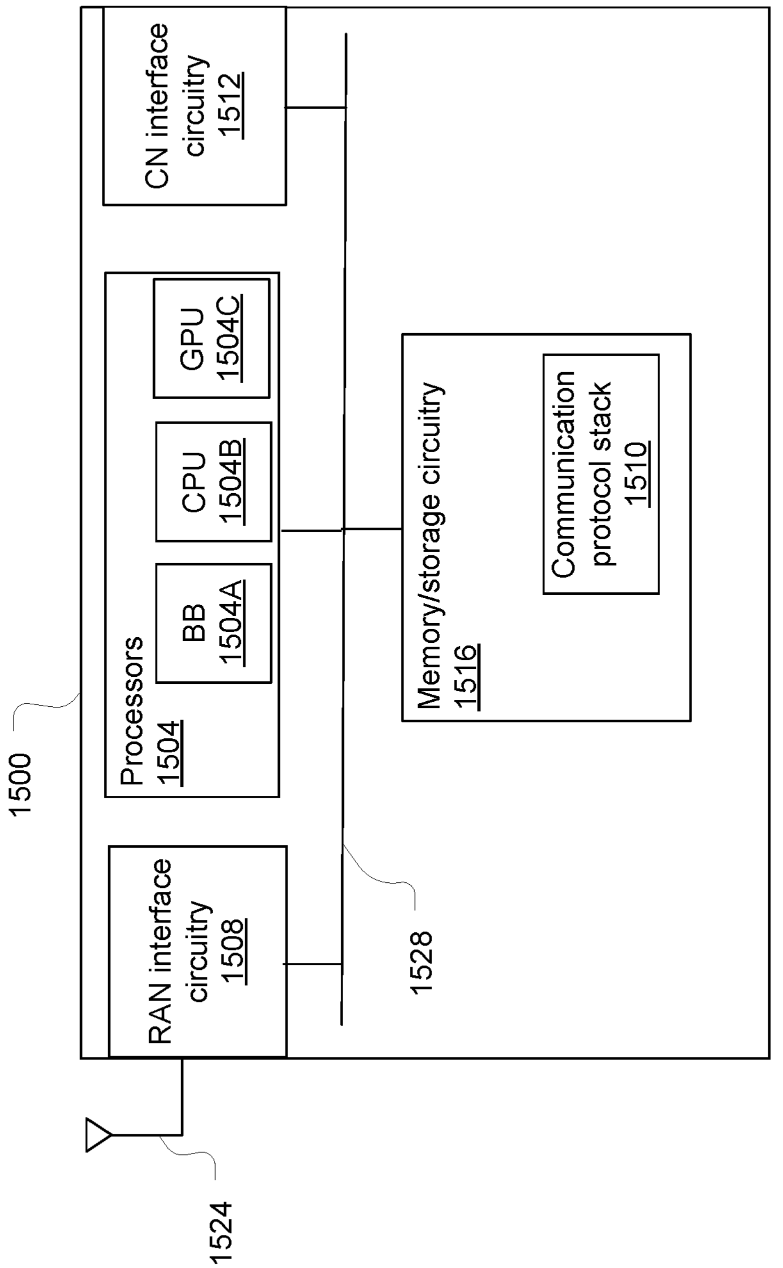
FIG. 15 illustrates an example of a base station, in accordance with some embodiments.

FIG. 15 illustrates a gNB 1500, in accordance with some embodiments. The gNB 1500 may be similar to and substantially interchangeable with any of the base stations described herein above.

The gNB 1500 may include processors 1504, RAN interface circuitry 1508, core network (CN) interface circuitry 1512, and memory/storage circuitry 1516.

The components of the gNB 1500 may be coupled with various other components over one or more interconnects 1528.

The processors 1504, RAN interface circuitry 1508, memory/storage circuitry 1516 (including communication protocol stack 1510), antenna 1550, and interconnects 1528 may be similar to like-named elements shown and described with respect to FIG. 14.

The CN interface circuitry 1512 may provide connectivity to a core network, for example, a Fifth Generation Core network (5GC) using a 5GC-compatible network interface protocol, such as carrier Ethernet protocols, or some other suitable protocol. Network connectivity may be provided to/from the gNB 1500 via a fiber optic or wireless backhaul. The CN interface circuitry 1512 may include one or more dedicated processors or FPGAs to communicate using one or more of the aforementioned protocols. In some implementations, the CN interface circuitry 1512 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method implemented by a user equipment (UE), the method comprising: receiving first configuration information and second configuration information, wherein the first configuration information indicates, for each cell of a plurality of cells, a configuration of the cell, and wherein the second configuration information is separate from the first configuration information and indicates a layer 1/layer 2 triggered mobility (LTM) association between two or more of the plurality of cells; establishing a first connection with a first cell of the plurality of cells, wherein the first connection is associated with medium access control (MAC) and radio link control (RLC) information; receiving a command to establish a second connection with a second cell of the plurality of cells; determining, based on the second configuration information, whether at least one of a MAC reset or an RLC reset is to be performed; and establishing the second connection based on the determining.

Example 2 includes the method of example 1, wherein the first configuration information and the second configuration information are received via radio resource control (RRC) signaling, wherein the first configuration information includes, for each cell of the plurality of cells, an LTM cell configuration, wherein the second configuration information includes a reset group configuration indicating the LTM association, and wherein the LTM association indicates that the two or more cells are provided by a same base station distributed unit.

Example 3 includes the method of example 2, wherein the LTM configuration corresponding to the second cell further indicates whether the second cell and the first cell are LTM associated as being provided by a same base station distributed unit.

Example 4 includes the method of any examples 1-3, wherein the second configuration information indicates that the first cell and the second cell are part of the two or more cells having the LTM association, and wherein the determining indicates that the MAC reset and the RLC reset are to be foregone.

Example 5 includes the method of any examples 1-4, wherein the second configuration information indicates that the first cell and the second cell are excluded from the two or more cells having the LTM association, and wherein the determining indicates that the MAC reset and the RLC reset are to be performed.

Example 6 includes the method of any examples 1-5, wherein the second configuration information indicates that the first cell and the second cell are part of the two or more cells having the LTM association, and wherein the LTM association indicates that the MAC reset is to be foregone and that the RLC reset is to be performed.

Example 7 includes the method of any examples 1-6, wherein the second configuration information indicates that the two or more cells form a group of cells that has the LTM association and associates the first cell and the second cell with the group.

Example 8 includes the method of any examples 1-7, wherein the second configuration information includes group information for the group, and wherein the group information includes a first configuration identifier of the first cell and a second configuration identifier of the second cell.

Example 9 includes the method of any examples 1-8, wherein the second configuration information includes group information for the group, and wherein the group information includes a first cell identifier of the first cell, a second cell identifier of the second cell, and absolute radio frequency channel number (ARFCN).

Example 10 includes the method of any examples 1-9, wherein the second configuration information includes group information for the group, and wherein the group information includes an indication whether the at least one of the MAC reset or the RLC reset is to be performed.

Example 11 includes the method of any examples 1-10, wherein the second configuration information indicates that the two or more cells form a group of cells that has the LTM association and includes group information for the group, wherein the first configuration information includes, for the second cell, an LTM cell configuration that indicates the group.

Example 12 includes the method of example 11, wherein determining whether the at least one of the MAC reset or the RLC reset is to be performed comprises: determining, based on the LTM cell configuration, that the second cell belongs to the group; determining that the first cell belongs to the group; and determining, based on the group information, that the LTM association applies to the second cell based on the second cell and the second cell belonging to the group.

Example 13 includes the method of example 11, wherein the first configuration information includes, for the second cell, a reference to the group.

Example 14 includes the method of any examples 1-13, wherein the second configuration information indicates that the two or more cells form a default LTM group of cells that has the LTM association, and wherein the method further comprises: determining that the first cell and the second cell belong to the default LTM group based on absence of an explicit indication that the first cell and the second cell belong to another LTM group.

Example 15 includes the method of any examples 1-14, wherein the second configuration information indicates that the two or more cells form a default LTM group of cells that has the LTM association, wherein the first configuration information includes, for the second cell, an LTM cell configuration, and wherein the method further comprises: determining that the second cell belong to the default LTM group based on absence of an explicit indication in the LTM cell configuration that the second cell belong to another LTM group.

Example 16 includes the method of any examples 1-15, wherein the second configuration information includes a bitstring indicating LTM associations between the plurality of cells, and wherein determining whether the at least one of the MAC reset or the RLC reset is to be performed comprises: determining, based on the bitstring, a bit value that corresponds to the first cell and the second cell; and determining, based on the bit value, that at least one of the MAC reset or the RLC reset is to be performed.

Example 17 includes the method of example 16, wherein the bit value corresponds to a single bit indicating that both the MAC reset and the RLC reset are to be performed.

Example 18 includes the method of example 16, wherein the bit value corresponds to a plurality of bits, wherein at least a first bit of the plurality of bits indicates that the MAC reset is to be performed, and wherein a second bit of the plurality of bits indicates that the RLC reset is be performed.

Example 19 includes the method of any examples 1-18, wherein the second configuration information includes a first bitstring and a second bitstring that indicate LTM associations between the plurality of cells, and wherein determining whether the at least one of the MAC reset or the RLC reset is to be performed comprises: determining, based on the first bitstring, a first bit value that corresponds to the first cell and the second cell and that indicates whether the MAC reset is to be performed; and determining, based on the second bitstring, a second bit value that corresponds to the first cell and the second cell and that indicates whether the RLC reset is to be performed.

Example 20 includes the method of any examples 1-19, wherein the second configuration information indicates a source configuration identifier and a threshold distance, and wherein determining whether the at least one of the MAC reset or the RLC reset is to be performed comprises: determining a difference between a second configuration identifier of the second cell and the source configuration identifier; and determining that the MAC reset and the RLC reset are to be foregone in case the difference being less than or equal to the threshold distance and are to be performed in case the difference is larger than the threshold distance.

Example 21 includes the method of any examples 1-20, wherein the second configuration information indicates that the two or more cells form a group of cells that has the LTM association, wherein the group corresponds to a base station distributed unit.

Example 22 includes the method of any examples 1-21, wherein establishing the second connection comprises sending a random access channel message on the second cell, and wherein the method further comprises: receiving, from the first cell in response to the random access channel message, a random access response indicating timing advance information for the second cell, wherein the random access response is received from the first cell instead of the second cell based on the first cell and the second cell being part of the two or more cells having the LTM association.

Example 23 includes the method of any examples 1-22, wherein at least one of the first configuration information, the second configuration information, or additional configuration information indicates that the random access response is to be received on the first cell.

Example 24 includes a method implemented by a network, the method comprising: sending, to a user equipment (UE), first configuration information and second configuration information, wherein the first configuration information indicates, for each cell of a plurality of cells, a configuration of the cell, and wherein the second configuration information is separate from the first configuration information and indicates a layer 1/layer 2 triggered mobility (LTM) association between two or more of the plurality of cells; establishing a first connection with the UE via a first cell of the plurality of cells, wherein the first connection is associated with medium access control (MAC) and radio link control (RLC) information; sending, to the UE, a command to establish a second connection with a second cell of the plurality of cells; and establishing the second connection based on the first configuration information and the second configuration information.

Example 25 includes the method of example 24, wherein the network includes a base station distributed unit, wherein the first cell is provided by a first transmission and reception point of the base station distributed unit, and wherein the second cell is provided by a second transmission and reception point of the base station distributed unit.

Example 26 includes the method of any examples 24-25, wherein the first configuration information includes, for each cell of the plurality of cells, an LTM cell configuration, and wherein the second configuration information includes a reset group configuration indicating the LTM association.

Example 27 includes the method of any examples 24-26, wherein the second configuration information indicates that the two or more cells form a default LTM group of cells that has the LTM association and excludes an explicit indication that the first cell and the second cell belong to another LTM group.

Example 28 includes the method of any examples 24-27, wherein the second configuration information indicates that the two or more cells form a default LTM group of cells that has the LTM association, wherein the first configuration information includes, for the second cell, an LTM cell configuration, and wherein the LTM cell configuration excludes an explicit indication that the second cell belong to another LTM group.

Example 29 includes the method of any examples 24-28, wherein the second configuration information includes a bitstring indicating LTM associations between the plurality of cells.

Example 30 includes the method of any examples 24-29, wherein the second configuration information indicates a source configuration identifier and a threshold distance.

Example 31 includes the method of any examples 24-30, wherein at least one of the first configuration information, the second configuration information, or additional configuration information that indicates at least one of a random access response or a timing advance value in response to a random access channel message that is sent on a target cell is to be received on a source cell, wherein the target cell and the source cell are part of the two or more cells that have the LTM association.

Example 32 includes a device comprising means to perform one or more elements of a method described in or related to any of the examples 1-31.

Example 33 includes one or more non-transitory computer-readable media comprising instructions to cause a device, upon execution of the instructions by one or more processors of the device, to perform one or more elements of a method described in or related to any of the examples 1-31.

Example 34 includes a device comprising logic, modules, or circuitry to perform one or more elements of a method described in or related to any of the examples 1-31.

Example 35 includes a device comprising: one or more processors and one or more computer-readable media comprising instructions that, when executed by the one or more processors, cause the one or more processors to perform one or more elements of a method described in or related to any of the examples 1-31.

Example 36 includes a system comprising means to perform one or more elements of a method described in or related to any of the examples 1-31.

Example 37 includes a network comprising means to perform one or more elements of a method described in or related to any of the examples 1-31.

Example 38 includes one or more non-transitory computer-readable media comprising instructions to cause a network, upon execution of the instructions by one or more processors of the network, to perform one or more elements of a method described in or related to any of the examples 1-31.

Example 39 includes a network comprising logic, modules, or circuitry to perform one or more elements of a method described in or related to any of the examples 1-31.

Example 40 includes a network comprising: one or more processors and one or more computer-readable media comprising instructions that, when executed by the one or more processors, cause the one or more processors to perform one or more elements of a method described in or related to any of the examples 1-31.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:

processing first configuration information and second configuration information, wherein the first configuration information indicates, for each cell of a plurality of cells, a configuration of the cell, and wherein the second configuration information is separate from the first configuration information, indicates a layer 1 or layer 2 triggered mobility (LTM) association between two or more cells of the plurality of cells, and wherein the second configuration information indicates that the two or more cells form a default LTM group of cells that has the LTM association;

causing a first connection to be established with a first cell of the plurality of cells, wherein the first connection is associated with medium access control (MAC) and radio link control (RLC) information;

processing a command to establish a second connection with a second cell of the plurality of cells;

determining that the first cell and the second cell belong to the default LTM group based on absence of an explicit indication that the first cell and the second cell belong to another LTM group;

determining, based on the second configuration information, whether at least one of a MAC reset or an RLC reset is to be performed; and causing the second connection to be established based on the determining whether at least one of the MAC reset or the RLC reset is to be performed.

2. The method of claim 1, wherein the first configuration information and the second configuration information are received via radio resource control (RRC) signaling, wherein the first configuration information includes, for each cell of the plurality of cells, an LTM cell configuration, wherein the second configuration information includes a reset group configuration indicating the LTM association, and wherein the LTM association indicates that the two or more cells are provided by a same base station distributed unit.

3. The method of claim 1, wherein the determining whether at least one of the MAC reset or the RLC reset is to be performed includes determining that the MAC reset and the RLC reset are to be foregone.

4. The method of claim 1, further comprising receiving third configuration information indicating that a third cell is excluded from the two or more cells having the LTM association, and determining the MAC reset and the RLC reset are to be performed for an LTM cell switch from the second cell to the third cell.

5. The method of claim 1, wherein the LTM association indicates that the MAC reset is to be foregone and that the RLC reset is to be performed.

6. The method of claim 1, wherein the second configuration information includes group information for the default LTM group, wherein the first configuration information includes, for the second cell, an LTM cell configuration that indicates the default LTM group.

7. The method of claim 1, wherein the second configuration information includes a bitstring indicating LTM associations between the plurality of cells, and wherein determining whether the at least one of the MAC reset or the RLC reset is to be performed comprises:

determining, based on the bitstring, a bit value that corresponds to the first cell and the second cell; and determining, based on the bit value, that at least one of the at least one of the MAC reset or the RLC reset is to be performed.

8. An apparatus comprising:

processing circuitry to:

process first configuration information and second configuration information, wherein the first configuration information indicates, for each cell of a plurality of cells, a configuration of the cell, and wherein the second configuration information is separate from the first configuration information, indicates a layer 1 or layer 2 triggered mobility (LTM) association between two or more cells of the plurality of cells, and indicates that the two or more cells form a default LTM group of cells that has the LTM association;

cause a first connection to be established with a first cell of the plurality of cells, wherein the first connection is associated with medium access control (MAC) and radio link control (RLC) information;

process a command to establish a second connection with a second cell of the plurality of cells, wherein the first configuration information includes, for the second cell, an LTM cell configuration;

determine that the second cell belongs to the default LTM group based on absence of an explicit indication in the LTM cell configuration that the second cell belongs to another LTM group determine, based on the second configuration information, whether at least one of a MAC reset or an RLC reset is to be performed; and cause the second connection to be established based on the determination of whether at least one of a MAC reset or an RLC reset is to be performed; and interface circuitry, coupled to the processing circuitry, to receive the first configuration information and the second configuration information.

9. The apparatus of claim 8, wherein the default LTM group corresponds to a base station distributed unit.

10. The apparatus of claim 8, wherein establishing the second connection comprises sending a random access channel message on the second cell, and wherein the processing circuitry is further configured to:

receive, from the first cell in response to the random access channel message, a random access response indicating timing advance information for the second cell, wherein the random access response is received from the first cell instead of the second cell based on the first cell and the second cell being part of the two or more cells having the LTM association.

11. A method comprising:

sending, to a user equipment (UE), first configuration information and second configuration information, wherein the first configuration information indicates, for each cell of a plurality of cells, a configuration of the cell, and wherein the second configuration information is separate from the first configuration information and indicates that two or more cells of the plurality of cells form a default layer 1 or layer 2 triggered mobility (LTM) group of cells that has an LTM association, and excludes an explicit indication that the first cell and the second cell belong to another LTM group;

establishing a first connection with the UE via a first cell of the plurality of cells, wherein the first connection is associated with medium access control (MAC) and radio link control (RLC) information;

sending, to the UE, a command to establish a second connection with a second cell of the plurality of cells; and establishing the second connection based on the first configuration information and the second configuration information.

12. The method of claim 11, wherein the first cell is provided by a first transmission and reception point of a base station distributed unit, and wherein the second cell is provided by a second transmission and reception point of the base station distributed unit.

13. The method of claim 11, wherein the first configuration information includes, for each cell of the plurality of cells, an LTM cell configuration, and wherein the second configuration information includes a reset group configuration indicating the LTM association.

14. The method of claim 11, wherein the first configuration information includes, for the second cell, an LTM cell configuration, and wherein the LTM cell configuration excludes an explicit indication that the second cell belongs to another LTM group.

15. The method of claim 11, wherein the second configuration information includes a bitstring indicating LTM associations between the plurality of cells.

16. The method of claim 11, wherein the second configuration information indicates a source configuration identifier and a threshold distance.

* * * * *